United States Patent
Mitsunobu et al.

(10) Patent No.: US 9,197,566 B2
(45) Date of Patent: Nov. 24, 2015

(54) INFORMATION PROCESSING METHOD, RECORDING MEDIUM, AND INFORMATION PROCESSING APPARATUS

(71) Applicant: FUJITSU LIMITED, Kawasaki (JP)

(72) Inventors: Hideki Mitsunobu, Kawasaki (JP); Toshihiko Kurita, Kawasaki (JP); Mitsuaki Kakemizu, Sagamihara (JP)

(73) Assignee: FUJITSU LIMITED, Kawaski (JP)

( * ) Notice: Subject to any disclaimer, the term of this patent is extended or adjusted under 35 U.S.C. 154(b) by 284 days.

(21) Appl. No.: 13/960,129

(22) Filed: Aug. 6, 2013

(65) Prior Publication Data

US 2014/0115183 A1    Apr. 24, 2014

(30) Foreign Application Priority Data

Oct. 24, 2012   (JP) ................. 2012-235212

(51) Int. Cl.
  *G06F 15/16*   (2006.01)
  *G06F 15/173*  (2006.01)
  *H04L 12/815*  (2013.01)
  *H04L 12/863*  (2013.01)

(52) U.S. Cl.
  CPC .............. *H04L 47/22* (2013.01); *H04L 47/621* (2013.01)

(58) Field of Classification Search
  CPC . G06F 9/45558; G06F 9/5072; G06F 9/5077; G06F 2209/5022; G06F 9/45533; G06F 9/4856; G06F 9/505; G06F 9/5088; G06F 2009/4557; G06F 3/126; G06F 9/5083; H04L 47/6295; H04L 41/145; H04L 47/125; H04L 67/1002; H04L 47/6255; H04L 47/22; H04L 47/621
  See application file for complete search history.

(56) References Cited

U.S. PATENT DOCUMENTS

| | | | |
|---|---|---|---|
| 2010/0131636 A1* | 5/2010 | Suri et al. ................ | 709/224 |
| 2012/0151479 A1* | 6/2012 | Kothari ..................... | 718/1 |
| 2012/0218595 A1* | 8/2012 | Miyazawa et al. ........... | 358/1.15 |
| 2012/0271926 A1* | 10/2012 | Shakirzyanov et al. ...... | 709/220 |
| 2013/0227562 A1* | 8/2013 | Tsirkin et al. ............. | 718/1 |

FOREIGN PATENT DOCUMENTS

JP    2011-180889    9/2011

* cited by examiner

*Primary Examiner* — Peling Shaw
(74) *Attorney, Agent, or Firm* — Staas & Halsey LLP

(57) ABSTRACT

An information processing method includes determining the number of packets to be transferred to a communication circuit for each of a plurality of communications so that the number of packets of each of the plurality of communications is equal to or greater than the number of packets to be used for communication analysis, in accordance with the communication amount of each of the plurality of communications and an upper limit of the transfer amount of packets to be transferred to the communication circuit.

15 Claims, 22 Drawing Sheets

FIG. 5A

| RECEPTION TIME : t | DESTINATION ADDRESS | TRANSMISSION SOURCE ADDRESS | PORT NUMBER | PAYLOAD |
|---|---|---|---|---|
| 3 | 00-90-27-AA-74-E0 | 00-90-27-BB-86-E3 | 80 | get index.html |
| 4 | 00-90-27-AA-74-E1 | 00-90-27-BB-86-E3 | 80 | get application.cgi |
| 10 | 00-90-27-AA-74-E2 | 00-90-27-CC-86-E4 | 23 | login |
| 11 | 00-90-27-AA-74-E0 | 00-90-27-BB-86-E3 | 80 | get image.jpg |
| 15 | 00-90-27-AA-74-E5 | 00-90-27-EE-86-E5 | 22 | request connection |
| ... | ... | ... | ... | ... |

FIG. 5B

| PORT NUMBER | COMMNET | FLOW ID |
|---|---|---|
| 80 | HTTP | 0 |
| 22 | SSH | 1 |
| 20 | FTP | 2 |
| 21 | FTP | 2 |
| 23 | Telnet | 3 |
| ... | ... | ... |

FIG. 5C

| TRANSMISSION SOURCE ADDRESS | FLOW ID |
|---|---|
| 00-90-27-BB-86-E3 | 10 |
| 00-90-27-CC-86-E4 | 11 |
| 00-90-27-EE-86-E5 | 12 |
| ... | ... |

FIG. 9

| QUEUE NUMBER (FLOW ID): n | COMMUNICATION AMOUNT: $T_n$ | SAMPLING RATIO: $R_n = 1/(T_n * \Sigma(1/T_n))$ | NUMBER OF PACKETS TO BE SAMPLED: $S_n = T_n * c * A_n * R_n$ |
|---|---|---|---|
| 0 | 1 kB/s | $1/(1*\Sigma(1/T_n)) = 8/11$ | $1*c*A_n*8/11 = c*A_n*8/11$ |
| 1 | 4 kB/s | $1/(4*\Sigma(1/T_n)) = 2/11$ | $4*c*A_n*2/11 = c*A_n*8/11$ |
| 2 | 8 kB/s | $1/(8*\Sigma(1/T_n)) = 1/11$ | $8*c*A_n*1/11 = c*A_n*8/11$ |
| ... | ... | ... | ... |

FIG. 15A

| ID OF VM | CPU CORE USAGE RATE |
|---|---|
| 0 | 60% |
| 1 | 70% |
| 2 | 90% |
| ... | ... |

FIG. 15B

| TYPE OF COMMUNICATION BY VM WHOSE CPU CORE USAGE RATE IS HIGHER THAN THRESHOLD | CPU CORE USAGE RATE |
|---|---|
| COMMUNICATION PASSING THROUGH LOAD BALANCER | 30% |
| COMMUNICATION NOT PASSING THROUGH LOAD BALANCER | 60% |

FIG. 15C

| TRAFFIC NUMBER | TRANSMISSION SOURCE ADDRESS | COMMUNICATION AMOUNT | FLOW ID | CPU CORE USAGE RATE |
|---|---|---|---|---|
| 0 | 00-90-27-BB-86-E3 | 1Gbps | 2 | 7.5% |
| 1 | 00-90-27-BB-86-E3 | 1Gbps | 3 | 7.5% |
| 2 | 00-90-27-CC-86-E4 | 2Gbps | 1 | 15% |

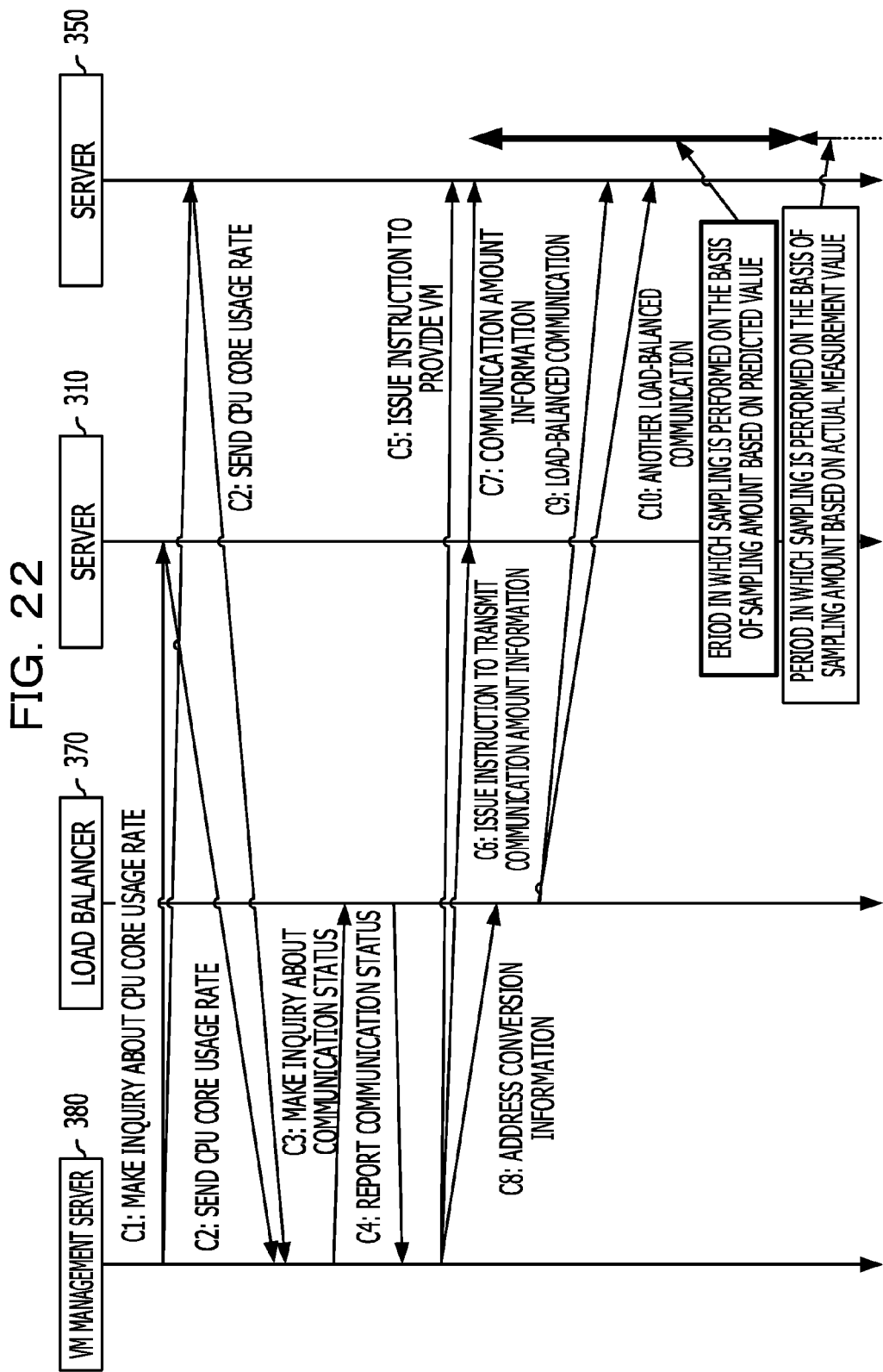

INFORMATION PROCESSING METHOD, RECORDING MEDIUM, AND INFORMATION PROCESSING APPARATUS

CROSS-REFERENCE TO RELATED APPLICATIONS

This application is based upon and claims the benefit of priority from the prior Japanese Patent Application No. 2012-235212 filed on Oct. 24, 2012, the entire contents of which are incorporated herein by reference.

FIELD

The embodiments discussed herein are related to an information processing method, a recording medium, and an information processing apparatus.

BACKGROUND

In data centers, processing requested from a client is executed by a virtual machine (VM), and the result of the executed processing is transmitted to the client. Furthermore, a plurality of virtual machines transfer information between each other and cooperate with each other, and specific processing is performed in a distributed manner. Such communication operations by virtual machines may be called flows. In order to manage a system using a data center, communication status is monitored for each flow.

FIG. 1 illustrates a related art. A data center 1 includes a server 2, a virtual machine management server (VM machine management server) 3, and an analysis device 4. The server 2 includes a virtual machine 5, a virtual machine 6, a virtual switch (vSW) 7, network interface cards (NICs) 8 to 10, and an input/output (IO) bus 11. The virtual switch 7 includes a buffer 12.

The virtual machines 5 and 6 receive a processing request from a client through a network 13, perform the requested processing by using allocated physical resources, and transmit processing results to the client. Processing results transmitted in accordance with corresponding processing timings of the individual virtual machines 5 and 6 are sequentially buffered into the buffer 12 provided in the virtual switch 7. Then, the processing results are transferred to the NIC 8, which is a communication circuit, and are transmitted to the client. Allocation of the physical resources to the virtual machines 5 and 6 in the sever 2 is performed in accordance with management information transmitted from the VM management server 3 through the NIC 9 to the server 2.

Meanwhile, in order to analyze communication operations by the virtual machines 5 and 6, packets transmitted to the network 13 are collected. In order to collect packets, packets that have been sequentially buffered into the buffer 12 are transmitted through the NIC 10 to the analysis device 4. The analysis device 4 collects the transmitted packets. After a certain number of packets to be used for communication analysis are collected, the analysis device 4 performs communication analysis for the virtual machines 5 and 6.

A technology for suppressing the communication load on a network between a plurality of servers by integrating virtual machines that are arranged in a distributed manner for a plurality of servers and that communicate with one another to be arranged for a specific server is known.

Japanese Laid-open Patent Publication No. 2011-180889 is an example of related art.

SUMMARY

According to an aspect of the invention, an information processing method includes determining the number of packets to be transferred to a communication circuit for each of a plurality of communications so that the number of packets of each of the plurality of communications is equal to or greater than the number of packets to be used for communication analysis, in accordance with the communication amount of each of the plurality of communications and an upper limit of the transfer amount of packets to be transferred to the communication circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 5A, 5B, and 5C illustrate examples of packet information and communication identification information used in an embodiment;

FIG. 9 illustrates an example of sampling information used in an embodiment;

FIGS. 15A, 15B, and 15C illustrate management information managed by a VM management server used in an embodiment;

FIG. 22 illustrates an example of a process performed by an information processing system according to an embodiment.

DESCRIPTION OF EMBODIMENTS

According to an examination by an inventor, in the case where packets are collected for communication analysis, a situation in which only packets based on a particular type of communication are transferred to a communication circuit and packets based on other types of communication are difficult to transfer may occur. In this case, in order to ensure a certain number of packets to be collected so as to keep the accuracy of communication analysis, packets are collected for a long time.

Figure 1:
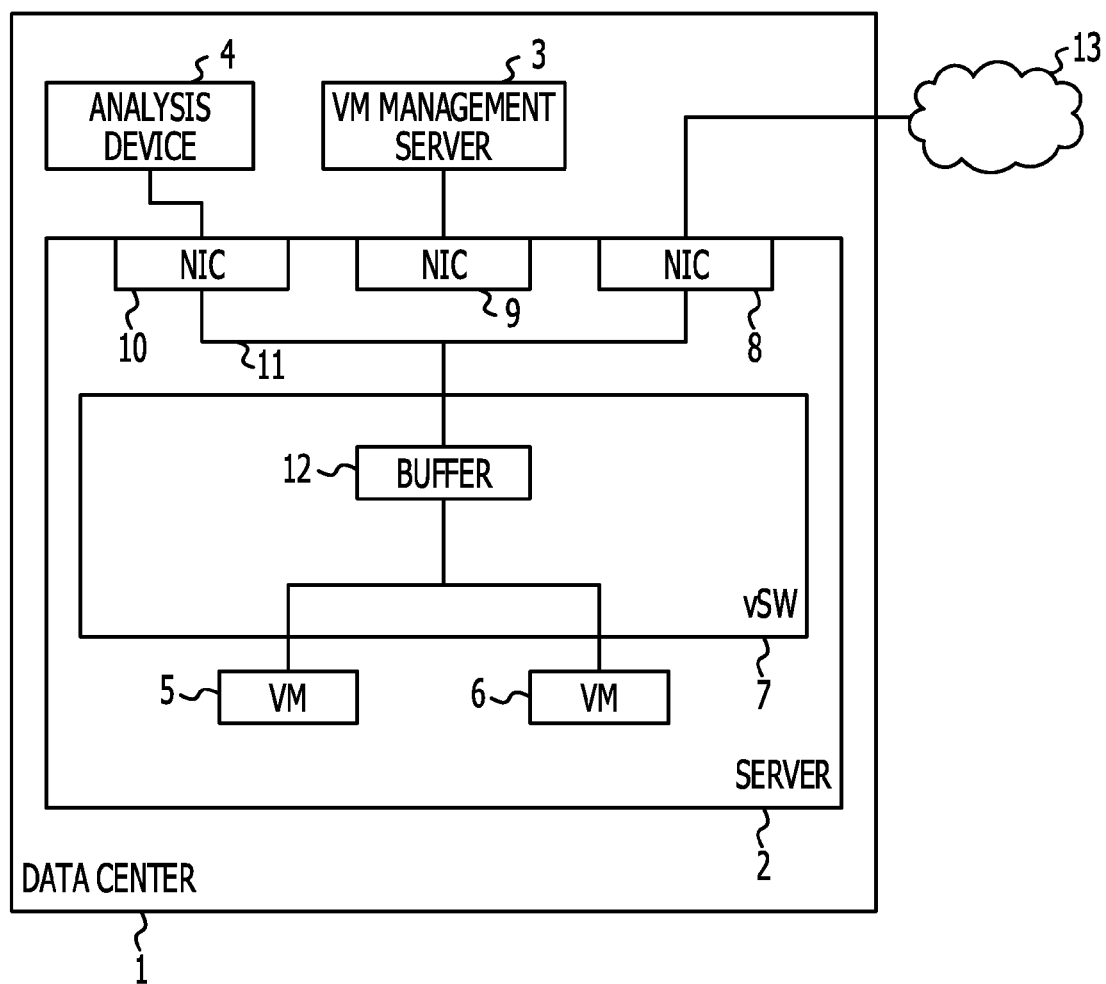
FIG. 1 illustrates a related art.

For example, in order that the virtual machines 5 and 6 illustrated in FIG. 1 transmit processing results to a client, packets as processing results are transmitted through the NIC 8 to the network 13. In contrast, all the packets are not necessarily transmitted through the NIC 10 to the analysis device 4.

The NICs 8 and 10 are coupled to the IO bus 11, and packet transfer to the NIC 8 and packet transfer to the NIC 10 are not performed at the same time. Thus, by the time during which the IO bus 11 is occupied being shared between the NICs 8 and 10, packets buffered in the buffer 12 are sequentially transferred to the NICs 8 and 10. Processing for transferring packets to the NIC 10 is processing performed for communication analysis. Thus, in order not to cause unwanted delay to occur in transmission of processing results to a client, the IO bus occupancy time for transfer of packets to the NIC 10 is secured within a range not affecting the occupancy time of the IO bus 11 for transfer of packets to the NIC 8.

Furthermore, since processing for transferring packets to the NIC 10 is processing performed for communication analysis, the processing amount of a central processing unit (CPU) allocated to packet transfer to the NIC 10 is decreased, and the CPU resources are allocated to various other processing operations, such as execution of the virtual machines 5 and 6, communication between the virtual machines 5 and 6, and communication with an apparatus outside the data center 1.

In the case where packets are transferred from the virtual machines 5 and 6 to the buffer 12, the CPU transfers data via a memory bus to a memory functioning as the buffer 12. For example, with the CPU at an operating speed of 4 GHz, data is transferred through a memory bus having a bus width of 128 bits to a memory at an operating speed of 1 GHz. In contrast, packet transfer processing from the buffer 12 to the NICs 8 and 10 is performed, for example, with the CPU through the IO bus having a bus width of 32 bits, at a transfer speed of 50 MHz. That is, in the case of transfer processing to the NICs 8 and 10, the time during which the CPU is occupied is increased by the order of about two digits, compared to the transfer processing to the memory functioning as the buffer 12. Furthermore, since the transfer capacity at the time when the NICs 8 and 10 transmit packets to the network 13 is limited, if the transfer capacity is exceeded, it may take a long time to start the processing of the CPU for transfer of packets to the NICs 8 and 10.

As described above, the CPU occupancy time allocated to the transfer processing for data to the NICs 8 and 10 is relatively longer than the CPU occupancy time allocated to the transfer processing for data to the memory. Especially, occupancy by the CPU resource allocated to the transfer processing for data to the NICs 8 and 10 relative to the entire CPU resources is large. Thus, allocating a limited CPU resource to processing other than the processing for communication analysis is desired.

For the above-described reasons, constraint conditions are imposed on the upper limit of the transfer amount at the time when packets buffered in the buffer 12 are transferred to the NIC 10, and allocation of the time during which the IO bus 11 is occupied and the processing amount of the CPU for packet transfer is done within the upper limit of the transfer amount.

For example, by thinning out packets buffered in the buffer 12 when the packets are transferred to the NIC 10, the number of packets transferred to the NIC 10 is limited, the time during which the IO bus 11 is occupied is shortened, and the processing amount of the CPU for packet transfer is decreased.

Furthermore, in the case where packets to be transferred to the NIC 10 are thinned out, the thinning out may be performed in a random manner. The reason why the thinning out is performed in a random manner is that since the virtual machines 5 and 6 transmit packets intermittently, if thinning out is performed at regular intervals, there is a possibility of only a particular type of packets being thinned out. By performing thinning out in a random manner, all the types of packets are evenly transmitted to the analysis device 4. In the case where the packets to be transferred to the NIC 10 are thinned out, since the analysis device 4 does not collect packets during the thinning out, it takes a certain amount of time to collect a certain number of packets to be used for communication analysis.

Furthermore, although not illustrated in FIG. 1, packets for communication analysis are transmitted from a plurality of servers to the analysis device 4. Thus, if individual servers transmit packets to the analysis device 4 without restriction, a number of packets beyond the receiving capacity of the analysis device 4 may be transmitted. Furthermore, in order to decrease the cost of the system, the performance of lines between the analysis device 4 and the plurality of servers may be suppressed, thus inevitably narrowing the bandwidth of the lines. Even in this case, constraint conditions may be imposed on the upper limit of the transfer amount of packets to be transferred to the NIC 10, which is a communication circuit. In order to restrict the number of packets to be transmitted to the analysis device 4, packets to be transferred to the NIC 10 may be thinned out.

However, when packets based on a plurality of types of communication are buffered and the number of packets to be transferred to the communication circuit is restricted by thinning out the buffered packets in order to meet the constraint conditions on the upper limit of the amount of transfer to the communication circuit, a situation may occur in which only packets based on a particular type of communication are transferred to the communication circuit but packets based on the other types of communication are difficult to transfer.

For example, in the case where there are differences in the communication amount among a plurality of communication operations, if thinning out is performed for packets based on communication whose communication amount is small, the number of packets transferred to the communication circuit is decreased. Thus, a certain number of packets that ensure accuracy of communication analysis are not collected. In this case, in order to collect a certain number of packets that ensure the accuracy of communication analysis, it takes a long time to collect the packets. Thus, it takes a long time to start communication analysis.

In contrast, if in order to increase the probability of packets based on communication whose communication amount is small being transferred to the communication circuit, the number of packets to be thinned out is decreased, the time during which the bus allocated for communication analysis is occupied is lengthened and the processing amount of the CPU is increased.

According to embodiments described below, by transferring a specific number of packets determined for each communication operation in such a manner that communication analysis is capable of being performed using the specific number of packets, in accordance with the communication amounts of a plurality of communication operations and the upper limit of the amount of packets to be transferred to a communication circuit, packets to be used for analysis is efficiently collected within the constraints.

Figure 2:
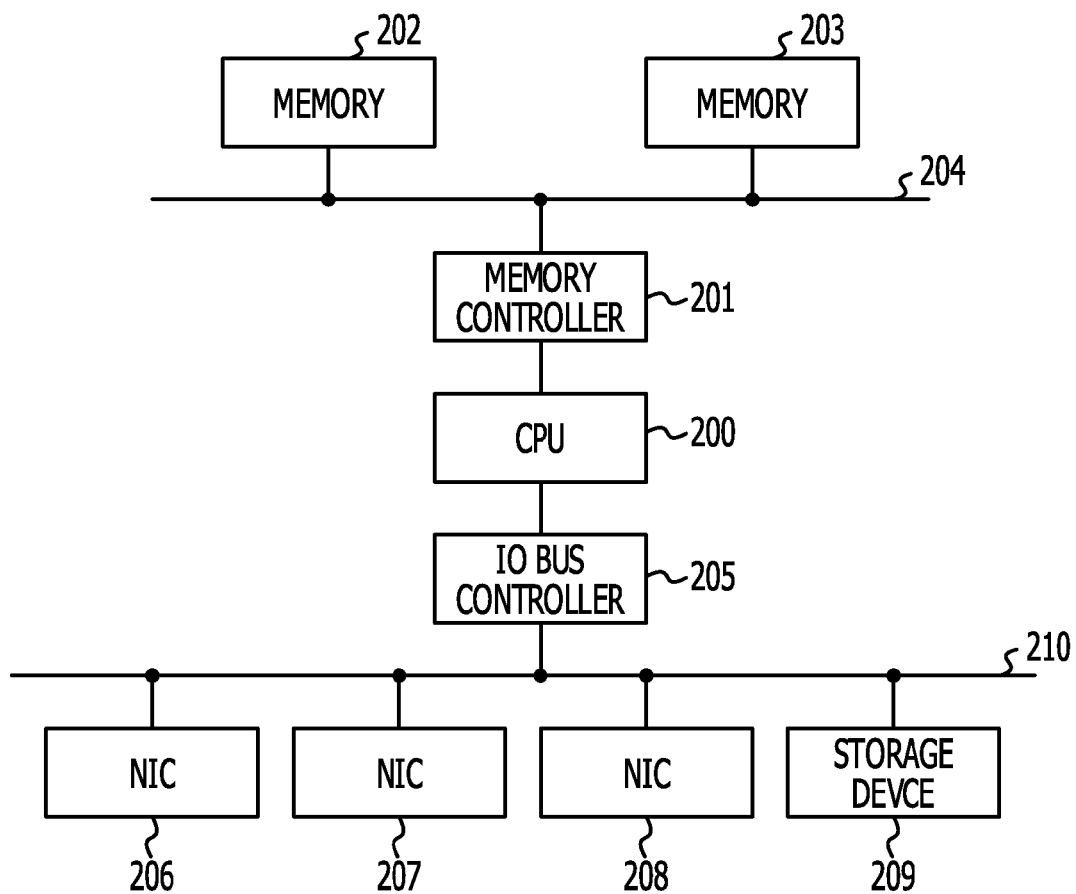
FIG. 2 illustrates the hardware configuration of a server used in an embodiment.

FIG. 2 illustrates an example of the hardware configuration of a server used in an embodiment. A server to which an embodiment is applied includes a CPU 200, a memory controller 201, memories 202 and 203, a memory bus 204, an IO bus controller 205, NICs 206 to 208, a storage device 209, and an IO bus 210.

A program for executing various types of processing for a server is stored in at least one of the memories 202 and 203, which are coupled to the memory bus 204. The CPU 200 reads a program from the memories 202 and 203 via the memory controller 201, and performs various types of processing. In accordance with the various types of processing performed by the CPU 200, writing and reading of data to and from the memories 202 and 203 are performed via the memory controller 201.

The CPU 200 transfers, via the IO bus controller 205, data and packets transmitted from the server to the NICs 206 to 208, which are coupled to the IO bus 210, and receives data and packets transmitted to the server. The CPU 200 reads, via the IO bus controller 205, data from the storage device 209, which is coupled to the IO bus 210, and writes data to the storage device 209.

The CPU 200 may include one or more CPU cores for executing various types of processing. Furthermore, each of the CPU cores may include one or more processors. The memories 202 and 203 are each, for example, a random access memory (RAM), such as a dynamic random access memory (DRAM). The storage device 209 is, for example, a nonvolatile memory, such as a read only memory (ROM) or a flash memory, or a magnetic disk device, such as a hard disk drive (HDD). The configuration in which the CPU 200, the memory controller 201, the memories 202 and 203, the NICs 206 to 208, and the storage device 209 are coupled to the same bus may be applied to an embodiment. With the hardware configuration of the server illustrated in FIG. 2, processing and functional blocks of the server, which will be described later, are implemented.

Figure 3:
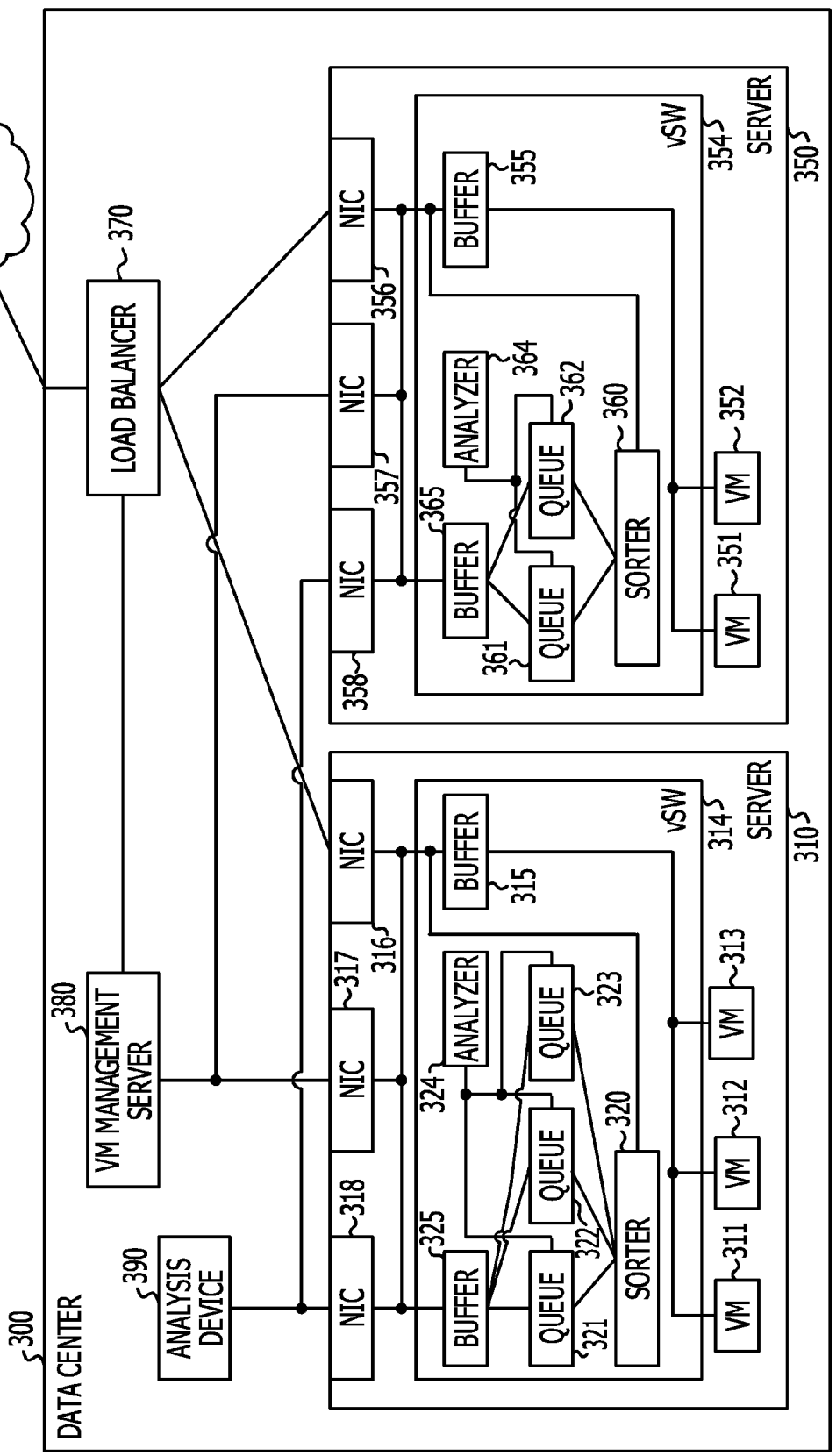
FIG. 3 illustrates an example of an information processing system according to an embodiment.

FIG. 3 illustrates an example of an information processing system according to an embodiment. A data center 300 is an example of an information processing system. The data center 300, which is coupled to a network 305, includes a server 310, a server 350, a load balancer 370, a VM management server 380, and an analysis device 390. The server 310 includes virtual machines 311 to 313, a virtual switch 314, buffers 315 and 325, NICs 316 to 318, a sorter 320, queues 321 to 323, and an analyzer 324. The communication circuits exemplified as the NICs 206 to 208 illustrated in FIG. 2 may be applied to the NICs 316 to 318. The server 350 includes virtual machines 351 and 352, a virtual switch 354, buffers 355 and 365, NICs 356 to 358, a sorter 360, queues 361 and 362, and an analyzer 364. The communication circuits exemplified as the NICs 206 to 208 illustrated in FIG. 2 may be applied to the NICs 356 to 358. Although the case where the servers 310 and 350 each have the hardware configuration illustrated in FIG. 2 will be described later, the servers 310 and 350 each do not necessarily have the hardware configuration illustrated in FIG. 2. Any hardware configuration with which processing as a computer is capable of being performed may be applied to the hardware configuration of the servers 310 and 350.

In the servers 310 and 350, the virtual machines 311 to 313, the virtual switch 314, the virtual machines 351 and 352, and the virtual switch 354 function when a program stored in the storage device 209 is loaded to the memories 202 and 203 used as working memories and the program loaded to the memories 202 and 203 is executed by the CPU 200. In the servers 310 and 350, physical resources are allocated to the virtual switch 314, the virtual machines 351 and 352, and the virtual switch 354, in accordance with management information transmitted from the VM management server 380 via the NICs 317 and 357 to the servers 310 and 350.

When a request for processing is transmitted to the data center 300 from a client coupled to the network 305, the request for processing is received by the load balancer 370. The load balancer 370 transmits the request for processing to the server 310 or the server 350, in accordance with the contents of the requested processing and a destination designated by the client.

The case where processing requested by a client is performed by the virtual machine 311 that operates in the server 310 will be explained as an example. The server 310 receives a request for processing from the client via the NIC 316. The virtual switch 314 receives the request from the NIC 316, and makes a determination as to the contents of the requested processing and a destination designated by the client. In accordance with the results of the determination, the requested processing is performed by the virtual machine 311. The result of the processing performed by the virtual machine 311 is buffered into the buffer 315 in the virtual switch 314. For the buffer 315, a storing region in the memory 202, the memory 203, or a register may be used. The processing result buffered in the buffer 315 is transferred via the IO bus to the NIC 316, and is transmitted via the load balancer 370 to the client coupled to the network 305.

Furthermore, in the data center 300, the virtual machines 311 to 313 communicate with one another and cooperate with one another, and the virtual machines 351 and 352 communicate with each other and cooperate with each other. Accordingly, the virtual machines 311 to 313 and the virtual machines 351 and 352 perform specific processing in a distributed manner.

Communication operations by the virtual machines described above may be called flows. In order to manage a system using the data center 300, the communication status is monitored for each of a plurality of flows. Flows are classified according to virtual machines, types of applications performed by virtual machines, transmission source addresses or destination addresses of packets to be transmitted, protocols of packets to be transmitted, and the like. Furthermore, in the case where a single virtual machine communicates with a plurality of clients, a plurality of flows may exist for the single virtual machine.

Here, an operation performed by a virtual switch in each of the servers 310 and 350 will be explained by way of an example of the virtual switch 314.

Packets transmitted from the virtual machines 311 to 313 are buffered into the buffer 315 of the virtual switch 314. The packets buffered in the buffer 315 are transferred to the NIC 316 so as to be transmitted to the network 305. Meanwhile, output of the buffer 315 is transferred to the sorter 320. Although not illustrated, input of the buffer 315 may be transferred to the sorter 320. The sorter 320 performs sorting of the received packets on the basis of header information of the packets. For example, sorting of the packets is performed on the basis of the transmission source address, the destination address, the type of a protocol, the ID of a virtual machine, or the like described in a header of each of the packets. Regarding the sorting criteria in sorting of packets by the sorter 320, for example, the type of unit in which packets are to be analyzed may be determined in accordance with an analysis policy for collecting packets and analyzing communication. The type of unit may be set to a granularity corresponding to a target of communication analysis.

The sorter 320 stores the packets into the queues 321 to 323 arranged for individual sorting criteria, in accordance with the sorting criteria. Some of the packets stored in the queues 321 to 323 are subjected to thinning out by disposing of the some of the packets in such a manner that a specific number of packets determined by the analyzer 324, which will be described later, are transferred to the buffer 325, and remaining packets that are not subjected to thinning out are transferred as packets sampled for communication analysis to the buffer 325. In the case where thinning out is performed for packets, since the virtual machines 311 to 313 transmit packets intermittently and there is a possibility of only a specific type of packets transmitted intermittently being subjected to thinning out if packet thinning is performed at regular intervals, all the types of packets may be made to be evenly sampled by performing packet thinning in a random manner. Detailed examples of the sorters 320 and 360 will be described later with reference to FIGS. 4 to 6.

The packets sampled from the queues 321 to 323 and stored in the buffer 325 are transferred to the NIC 318. The NIC 318 transmits the transferred packets to the analysis device 390, which collects packets for communication analysis based on the packets. For the queues 321 to 323 and the buffer 325, a storing region in the memory 202, the memory 203, or a register may be used.

Although the explanation has been provided with reference to FIG. 3, constraint conditions may be imposed on the upper limit of the amount of packets to be transferred from the buffer 325 to the NIC 318. This is because since the NIC 318 is coupled to the same IO bus as the NIC 316 for transmitting packets to the network 305, the occupancy time for transferring packets to the NIC 318 for the purpose of communication analysis is ensured within a range not affecting the occupancy time of the IO bus occupied for packet transfer to the NIC 316.

The communication amount of packets transmitted to the network 305 depends on the frequency of requests from a client and the type of packet to be transmitted. For example, in the case where moving image data is distributed, communication whose communication amount is relatively large is constantly performed. However, in the case of authentication processing for logging into an application or the like, the communication amount is relatively small since response to authentication processing is transmitted at a timing requested by a client. Furthermore, in the case where response is made to processing requested at the same time from a plurality of clients, the communication amount may increase. That is, the communication amount of packets transmitted to the network 305 varies.

The upper limit of the transfer amount of packets to be transferred to the NIC 318 may be determined in accordance with a variation of the communication amount of packets transmitted to the network 305, that is, a variation of the transfer amount of packets transferred to the NIC 316. Furthermore, the upper limit of the transfer amount of packets to be transferred to the NIC 318 may be set in such a manner that although the transfer amount of packets transferred to the NIC 316 varies, the transfer amount of packets to be transferred to the NIC 318 does not affect the occupancy time during which the IO bus is occupied when the transfer amount of packets transferred to the NIC 316 is the maximum. For example, a fixed value, such as one-512th or one-1024th of the number of packets transferred to the NIC 316, may be set as the upper limit of the number of packets to be transferred to the NIC 318.

The analyzer 324 determines the number of packets to be transferred to the buffer 325 for each of the queues 321 to 323 within the upper limit of the transfer amount of packets to be transferred to the NIC 318. This is because since packets stored in the queues 321 to 323 are packets sorted by the sorter 320 for each communication operation corresponding to the unit of communication analysis based on packets collected into the analysis device 390, the number of packets to be transferred to the buffer 325 is also determined by the analyzer 324 for each communication operation. In order to set the total number of packets in each communication operation within the upper limit of the transfer amount of packets to be transferred to the NIC 318, sampling is permed in such a manner that the number of remaining packets after thinning out of packets is performed in each of the communication operations is equal to the number of packets determined by the analyzer 324, and the number of packets to be sampled is determined by the analyzer 324 so as to be equal to or greater the number of packets to be used for communication analysis for each communication operation. Examples of the details of the analyzers 324 and 364 will be described later with reference to FIGS. 8 to 10.

Figure 4:
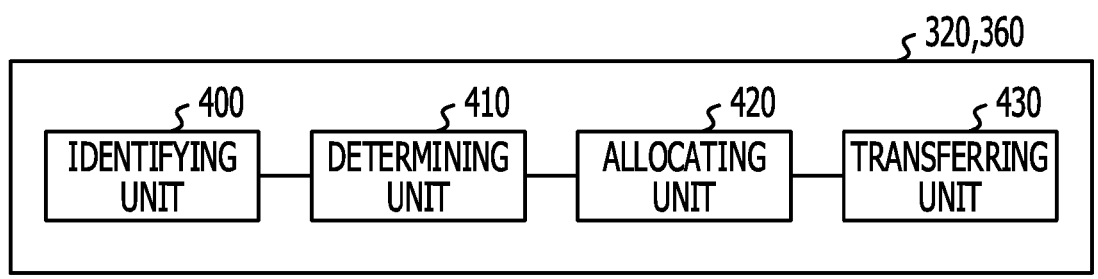
FIG. 4 illustrates an example of functional blocks of a sorter used in an embodiment.

FIG. 4 illustrates an example of functional blocks of a sorter used in an embodiment. When a program stored in the storage device 209 is loaded to the memories 202 and 203 and the program loaded to the memories 202 and 203 is executed by the CPU 200, each of the sorters 320 and 360 functions as an identifying unit 400, a determining unit 410, an allocating unit 420, and a transferring unit 430. Processing performed by each of the functional blocks will be described later in association with a process illustrated in FIG. 6.

FIGS. 5A to 5C illustrate examples of packet information and communication identification information in an embodiment. In FIGS. 5A to 5C, packet information and communication identification information are explained by way of an example of the sorter 320 in the virtual switch 314 that operates in the server 310 illustrated in FIG. 3. The operation explained by way of an example of the sorter 320 may also be performed by the sorter 360 in the virtual switch 354 that operates in the server 350.

FIG. 5A illustrates an example of packet information stored in the memory 202 or 203 on the basis of header information of packets received by the sorter 320. The reception time at which a packet is received, the destination address, the transmission source address, the port number of a transmission control protocol (TCP) based on header information of the packet, and payload information of the packet are associated with one another in packet information. For example, packet information represents that at the time when time is "3", a packet in which information of a destination address of "00-90-27-AA-74-E0", a transmission source address of "00-90-27-BB-86-E3", and a port number of "80" is stored as header information and "get index.html" is stored as payload information is received by the sorter 320.

The sorter 320 may serve as a device that performs sorting processing in the order of received packets and does not necessarily monitor the reception time. Furthermore, the sorter 320 does not necessarily manage payload information as the packet information illustrated in FIG. 5A. For example, the sorter 320 may determine information to be managed in packet information, in accordance with an analysis policy used when packets are collected and communication is analyzed and in accordance with the type of unit in which packet sorting is to be performed. Furthermore, as the destination address and the transmission source address, a media access control (MAC) address or an internet protocol (IP) address allocated to a physical server or a virtual machine serving as a communication destination, a switch or a router in a network, or the like may be used.

FIG. 5B illustrates an example of communication identification information stored in the memory 202 or 203. The communication identification information illustrated in FIG. 5B is information referred to by the sorter 320 when the sorter 320 performs sorting processing. The port number of a TCP, a comment relating to the port number of the TCP, and a flow ID are associated with one another in the communication identification information illustrated in FIG. 5B. For example, a flow ID of "0" is associated with a packet of "hypertext transfer protocol (HTTP)" with a port number of "80". Furthermore, a flow ID of "2" is associated with each of packets of "file transfer protocol (FTP)" with port numbers of "20" and "21". As described above, in the case where communication analysis is performed for each protocol corresponding to a port number, since communication operations are sorted according to port numbers, a flow ID for identifying the type of communication is associated with a port number. A comment relating to the port number of a TCP is information referred to when an administrator or the like who manages the information processing system refers to information. Thus, the comment is not necessarily managed as communication identification information.

FIG. 5C illustrates another example of communication identification information stored in the memory 202 or 203. The communication identification information illustrated in FIG. 5C is information referred to when the sorter 320 performs sorting processing. A transmission source address and a flow ID are associated with each other in the communication identification information illustrated in FIG. 5C. For example, a flow ID of "10" is associated with a packet with a transmission source address of "00-90-27-BB-86-E3". As described above, in the case where communication analysis is performed for each transmission source address, since communication operations are sorted according to transmission source addresses, a flow ID for identifying the type of communication is associated with a transmission source address. In the communication identification information illustrated in FIG. 5C, a flow ID may be associated with a destination address, instead of a transmission source address. In this case, communication is analyzed for each destination address. Furthermore, a flow ID may be associated with the combination of a transmission source address and a destination address, instead of a transmission source address. In this case, communication is analyzed for each combination of a transmission source address and a destination address. Furthermore, a flow ID may be associated with a combination of all or some of a transmission source address, a destination address, and a port number. In this case, analysis is performed in more complicated unit.

The sorter 320 manages packet information as illustrated in FIG. 5A on the basis of information on received packets, sorts the packets on the basis of the information on the received packets and the communication identification information illustrated in FIGS. 5B and 5C, and transfers packets for each communication operation in accordance with a flow ID to a corresponding one of the queues 321 to 323 allocated to respective flow IDs.

Figure 6:
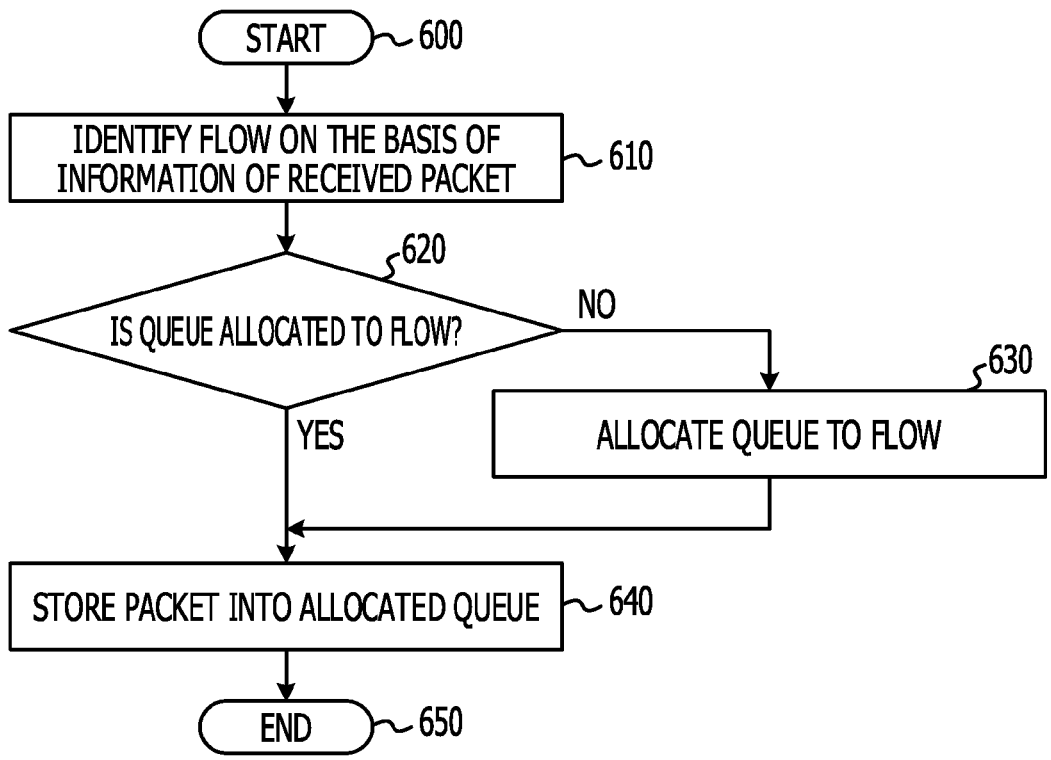
FIG. 6 illustrates an example of a process performed by a sorter used in an embodiment.

FIG. 6 illustrates an example of a process performed by a sorter used in an embodiment. The example of the process illustrated in FIG. 6 is performed by the sorter 320 and the sorter 360 illustrated in FIG. 3 when a program stored in the storage device 209 is loaded to the memories 202 and 203 used as working memories and the program loaded to the memories 202 and 203 is executed by the CPU 200. Here, the case where the process is performed by the sorter 320 is explained as an example. However, a similar process is also performed by the sorter 360. When receiving packets transmitted from the virtual machines 311 to 313, the sorter 320 performs processing 600 for starting a process for sorting packets.

Processing 610 for identifying a flow on the basis of information on a received packet is performed by the identifying unit 400. In processing 610, as illustrated in FIG. 5A, packet information is managed on the basis of the destination address, the transmission source address, and the port number of a TCP based on header information of the packet and payload information of the packet. Furthermore, in processing 610, a flow is identified in accordance with the communication identification information illustrated in FIG. 5B or 5C. Since in communication identification information, a flow ID is associated with any of a transmission source address, a destination address, and a port number, or all or some of the combination of a transmission source address, a destination address, and a port number, a flow ID is identified on the basis of header information and payload information contained in the received packet, in accordance with the association.

Processing 620 for determining whether or not a queue is allocated to the flow identified in processing 610 is performed by the determining unit 410. In the case where it is determined that a queue is allocated to the flow, the process proceeds to processing 640. In the case where it is determined that no queue is allocated to the flow, the process proceeds to processing 630.

Processing 630 for allocating a queue to the flow is performed by the allocating unit 420. In processing 630, any of a memory space in the memory 202 or 203 is allocated as a queue in which packets in the flow are to be stored. The sorter 320 manages association between a flow ID and a queue number. In the case where new association between a flow ID and a queue number is generated in processing 630, the sorter 320 updates information on association managed by the sorter 320 and stores the updated information into the memory 202 or 203. In the case where a queue in which no packet is stored for a certain period of time exists, allocation of the queue may be deleted by the sorters 320 and 360 from a memory space allocated as a queue in the memory 202 or 203.

Processing 640 for transferring the received packet to the queue allocated to the identified flow is performed by the transferring unit 430. The packet transferred in processing 640 is stored in any of the queues 321 to 323. After the packet is transferred in processing 640, in order to terminate processing for transferring the identified packet to the queue, processing 650 is performed by the sorter 320. Accordingly, the process is terminated.

Figure 7:
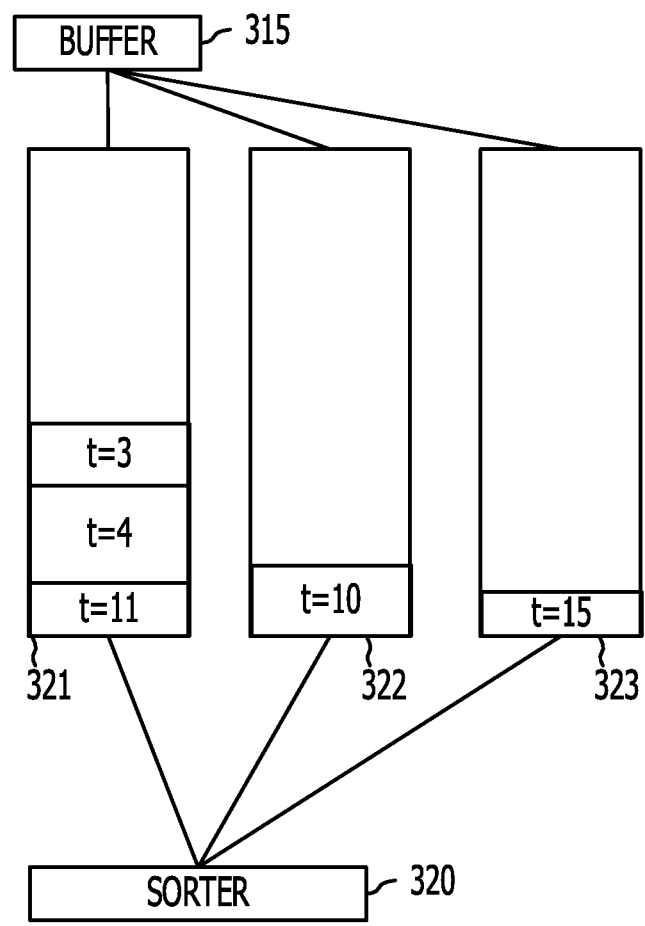
FIG. 7 illustrates an example of queues in which packets are stored in an embodiment.

FIG. 7 illustrates an example of queues in which packets are stored in an embodiment. The example in which packets transmitted from the virtual machines 311 to 313 are sorted and are stored in corresponding queues 321 to 323 as a result of the execution of the process illustrated in FIG. 6 by the sorter 320 is illustrated in FIG. 7. Here, explanation will be provided by way of an example of the buffer 315, the sorter 320, and the queues 321 to 323 provided in the server 310. For example, as in the packet information illustrated in FIG. 5A, the port number of packets whose reception times t are "3", "4", and "11" is "80". The sorter 320 identifies communication operations of the packets as a flow ID of "0" on the basis of the communication identification information illustrated in FIG. 5B in processing 610, and transfers the packets to the queue 321 corresponding to the flow ID "0" in processing 640. As illustrated in FIG. 7, the packets whose reception times t are "3", "4", and "11" are stored in the queue 321. In accordance with similar processing, a packet whose reception time t is "10" is stored in the queue 322, and a packet whose reception time t is "15" is stored in the queue 323.

As illustrated in FIG. 7, in the case where packets are stored into corresponding queues for each flow, if the communication amount differs from flow to flow, the number of stored packets may differ from queue to queue. In the case where packets are transferred to the buffer 315 from queues in which different number of packets are stored, by transferring a specific number of packets determined for each flow by the analyzer 324, which will be described later, the number of packets determined for each communication operation in unit of flow are stored into the buffer 315.

Figure 8:
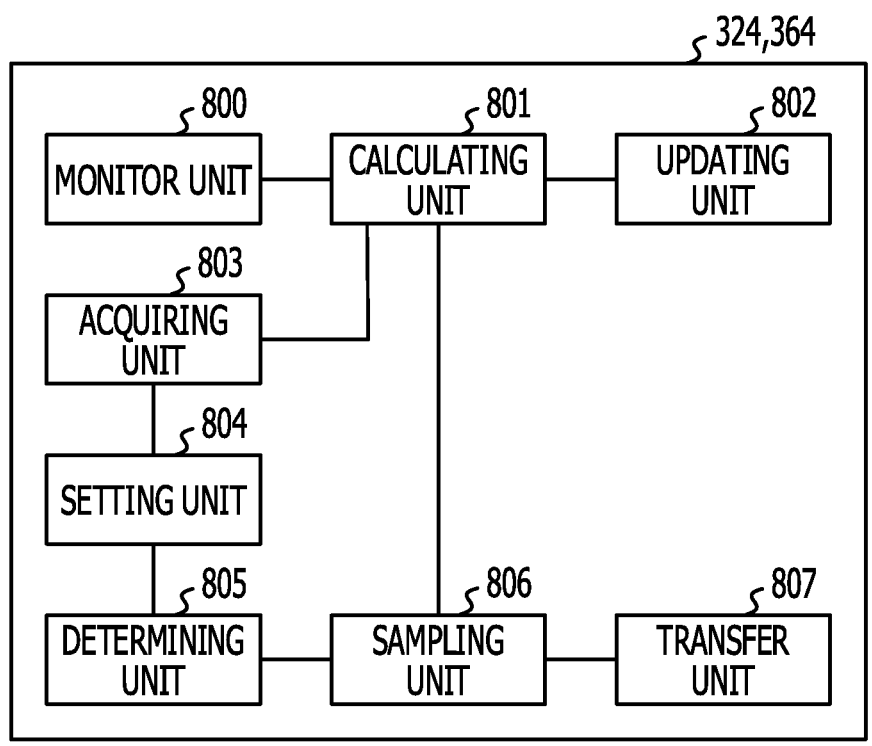
FIG. 8 illustrates an example of functional blocks of an analyzer used in an embodiment.

FIG. 8 illustrates an example of functional blocks of an analyzer used in an embodiment. When a program stored in the storage device 209 is loaded to the memories 202 and 203 used as working memories and the program loaded to the memories 202 and 203 is executed by the CPU 200, each of the analyzers 324 and 364 functions as a monitoring unit 800, a calculating unit 801, an updating unit 802, an acquiring unit 803, a setting unit 804, a determining unit 805, a sampling unit 806, and a transfer unit 807. Processing performed by each of the functional blocks will be explained later in association with a process illustrated in FIG. 10.

FIG. 9 illustrates an example of sampling information in an embodiment. Sampling information is information that is stored in the memory 202 or 203 and is updated by the analyzers 324 and 364. A queue number (flow ID), the communication amount of a flow, the sampling ratio for each queue in the case where packets stored in a corresponding queue are sampled, and the number of packets to be sampled are associated with one another in sampling information.

Here, "n", which represents a queue number, is not a sign provided in the drawing but a number for identifying the "n"th queue corresponding to the "n"th flow ID identified by the communication identification information illustrated in FIGS. 5B and 5C.

"Tn", which represents communication amount, represents the communication amount of the "n"th flow, which is a communication operation corresponding to the "n"th queue. As described later, the communication amount is measured by monitoring, with the analyzers 324 and 364, the number of packets stored in each queue, and is updated in sampling information.

"Rn", which represents sampling ratio, represents the sampling ratio in the case where packets stored in the "n"th queue are sampled. Here, ΣRn, which represents the total sum of the sampling ratios of each queue, is set to "1" and is represented as Rn=1/(Tn*Σ(1/Tn)).

"Sn", which represents the number of packets to be sampled, represents the number of packets to be sampled in the case where packets stored in the "n"th queue are sampled and the number of packets to be transferred from each queue to a buffer for buffering packets to be transferred to an NIC coupled to an analysis device. The number of packets to be sampled is represented by Sn=Tn*c*An*Rn. Here, ΣSn, which represents the total sum of the number of packets to be sampled for each queue, is set to be smaller than or equal to the upper limit of the transfer amount of packets to be transferred to the NIC coupled to the analysis device.

A variable "c" is determined in accordance with the upper limit of the transfer amount of packets to be transferred to the NIC coupled to the analysis device and is set to, for example, a small value in the case where the upper limit of the packet transfer amount is small. However, the variable "c" is adjusted so that ΣSn is smaller than or equal to the upper limit of the transfer amount of packets to be transferred to the NIC coupled to the analysis device.

A variable "An" is set when weighting is performed for the number of packets to be transferred for each flow. However, the variable "An" is adjusted so that ΣSn is smaller than or equal to the upper limit of the transfer amount of packets to be transferred to the NIC coupled to the analysis device.

For example, in the case where An is set to "1" for all the queues, the number of packets transferred from all the queues is the same. In this case, even if the communication amount differs from flow to flow, the number of packets transferred during a specific period of time is the same among all the flows. Thus, in the case where communication analysis based on the number of packets collected during a specific period of time is performed, since, for example, a certain number of packets are ensured to be collected for a communication operation of a small communication amount, the accuracy of communication analysis is maintained. Furthermore, in this case, the accuracy of communication analysis is the same among all the communication operations. In contrast, in the case where the number of packets to be used for communication analysis differs from flow to flow, by making a difference in the variable "An", a certain number of packets or more to be used for communication analysis for each flow are ensured to be collected within the upper limit of the transfer amount of packets to be transferred to the NIC.

As described above, in an embodiment, all the packets stored in queues are not transferred. A number of packets corresponding to the number of packets to be sampled for each flow determined by an analyzer so as to be equal to or greater than the number of packets to be used for communication analysis for each communication operation within the upper limit of the transfer amount of packets to be transferred to the NIC, are transferred.

Figure 10:
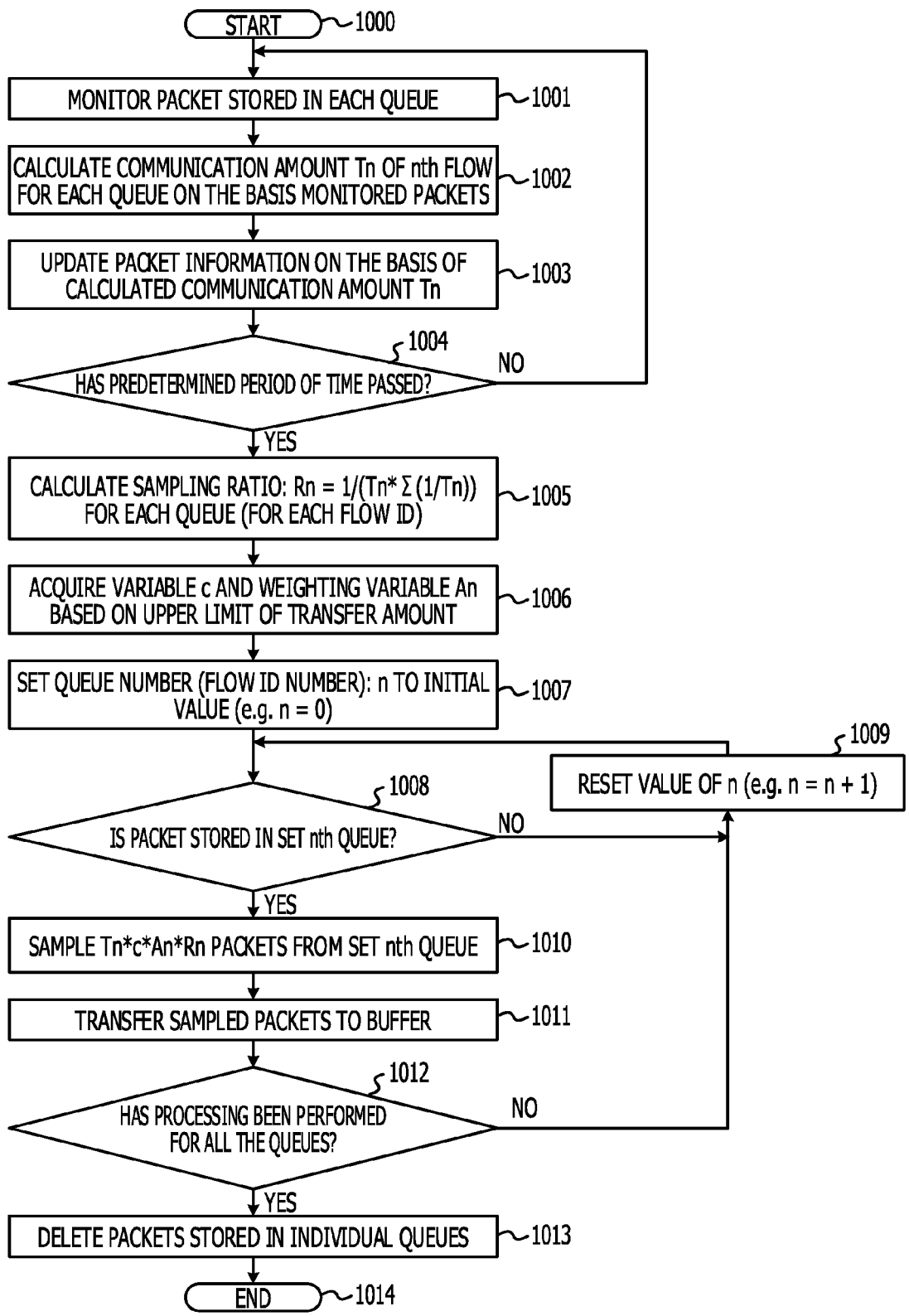
FIG. 10 illustrates an example of a process performed by an analyzer used in an embodiment.

FIG. 10 illustrates an example of a process performed by an analyzer used in an embodiment. In the example illustrated in FIG. 10, the process is performed by the analyzers 324 and 364 illustrated in FIG. 3 when a program stored in the storage device 209 is loaded to the memories 202 and 203 used as working memories and the program loaded to the memories 202 and 203 is executed by the CPU 200. With reference to FIG. 10, the case where the process is performed by the analyzer 324 will be explained as an example. However, a similar process is also performed by the analyzer 364.

When an instruction for execution of processing for determining the number of packets to be sampled for each flow is issued, processing 1000 for starting the process illustrated in FIG. 10 is performed by the analyzer 324.

Processing 1001 for monitoring packets to be stored in each queue is performed by the monitoring unit 800. In processing 1001, packets transferred from the sorter 320 to the queues 321 to 323 are monitored. In the case where a queue is added in processing 630 illustrated in FIG. 6, packets transferred from the sorter 320 to the added queue are also monitored. In contrast, in the case where a queue to which no packet has been transferred for a specific period of time is deleted, the monitoring unit 800 may stop monitoring the deleted queue.

Processing 1002 for calculating, for each queue, the communication amount Tn of the nth flow on the basis of the monitored packets is performed by the calculating unit 801. In processing 1002, for example, on the basis of the number of packets transferred from the sorter 320 to the queue 321 per unit time and the data amount of the packets, the communication amount of the flow corresponding to the queue 321 is calculated. Here, regarding the calculation of the communication amount for each flow in processing 1002, the communication amount per unit time may be calculated by regularly repeating calculation operations.

Processing 1003 for updating packet information on the basis of the calculated communication amount Tn is performed by the updating unit 802. In processing 1003, on the basis of the communication amount calculated in processing 1002, the communication amount Tn of the sampling information illustrated in FIG. 9 is updated.

Processing 1004 for determining whether or not a specific period of time has passed is performed by the monitoring unit 800. In the case where it is determined that the specific period of time has not passed, the process returns to processing 1001. In the case where it is determined that the specific period of time has passed, the process proceeds to processing 1005. In processing 1005, the number of packets to be sampled for each queue is calculated on the basis of the communication amount calculated in processing 1002. In the case where the calculation of the number of packets to be sampled is performed every time the communication amount is calculated in processing 1002, processing 1004 may be omitted. Since in processing 1004 the processing for calculating the number of packets to be sampled may be set to be performed at a timing different from the timing at which processing 1002 is performed, the specific period of time in processing 1004 may be set in accordance with the processing load allocated to the calculation of the number of packets to be sampled.

Processing 1005 for calculating $Rn=1/(Tn*\Sigma(1/Tn))$, which represents the sampling ratio for each queue (each flow ID), is performed by the calculating unit 801. In processing 1005, the sampling ratio Rn for each queue (each flow ID) is calculated on the basis of the communication amount Tn calculated in processing 1002, and the sampling ratio Rn in the sampling information illustrated in FIG. 9 is updated.

Processing 1006 for acquiring a variable "c" and a weighting variable "An" based on the upper limit of transfer amount is performed by the acquiring unit 803. In processing 1006, the variable "c" and the variable "An" explained with reference to FIG. 9 are read from the memory 202 or 203 and are acquired by the acquiring unit 803.

Processing 1007 for setting n, which represents a queue number (flow ID number), to an initial value is performed by the setting unit 804. In processing 1007, for example, "0" is set as the initial value of n.

Processing 1008 for determining whether or not a packet is stored in the set nth queue is performed by the determining unit 805. In the case where no packet is stored in the nth queue, the process proceeds to processing 1009. In the case where it is determined that a packet is stored in the nth queue, the process proceeds to processing 1010.

Processing 1009 for performing resetting for the value of n, which represents a queue number (flow ID number), is performed by the setting unit 804. In processing 1009, for example, processing for increasing the set value of n by one is performed. Here, in an embodiment, processing 1009 is not necessarily performed. An algorism for selecting each queue in such a manner that the number of packets to be sampled is determined for each queue (each flow) may be used.

Processing 1010 for sampling Tn*c*An*Rn packets from the set nth queue is performed by the sampling unit 806. Here, Tn represents the communication amount of the nth flow calculated in processing 1002, and "c" represents a variable that is acquired in processing 1006 and is determined in accordance with the upper limit of the transfer amount of packets to be transferred to the NIC coupled to the analysis device. Furthermore, "An" represents a variable that is acquired in processing 1006 and is set when weighting is performed for the number of packets to be transferred for each flow, and "Rn" represents the sampling ratio for the nth queue calculated in processing 1005. In processing 1010, Tn*c*An*Rn packets, which correspond to the number of packets to be sampled determined for each queue, are sampled. Here, since only Tn*c*An*Rn packets are to be sampled, Tn*c*An*Rn packets may be sampled in a random manner from packets stored in a queue. In a case where sampling is performed in a random manner, packets are evenly sampled from packets transferred intermittently and stored in a queue.

Processing 1011 for transferring the sampled packets to a buffer is performed by the transfer unit 807. In processing 1011, Tn*c*An*Rn packets sampled from the nth queue in processing 1010 are transferred to the buffer 315 illustrated in FIG. 3. Processing 1011 is not necessarily performed immediately after processing 1010. After sampling of packets for two or more queues is completed, the sampled packets may be collectively transferred to the buffer.

Processing 1012 for determining whether or not processing 1010 and processing 1011 have been performed for all the queues is performed by the determining unit 805. In the case where it is determined that processing 1010 and processing 1011 have not been performed for all the queues, the process returns to processing 1009. In the case where it is determined that processing 1010 and processing 1011 have been performed for all the queues, the process proceeds to processing 1013.

Processing 1013 for deleting packets stored in the individual queues is performed by the updating unit 802. In processing 1013, data is deleted from the individual queues. When processing 1014 is performed by the analyzer 324, the process for determining the number of packets to be sampled in communication for each flow is terminated. In the case where the process illustrated in FIG. 10 continues to be performed, after processing 1013, the process returns to processing 1001.

Figure 11A:
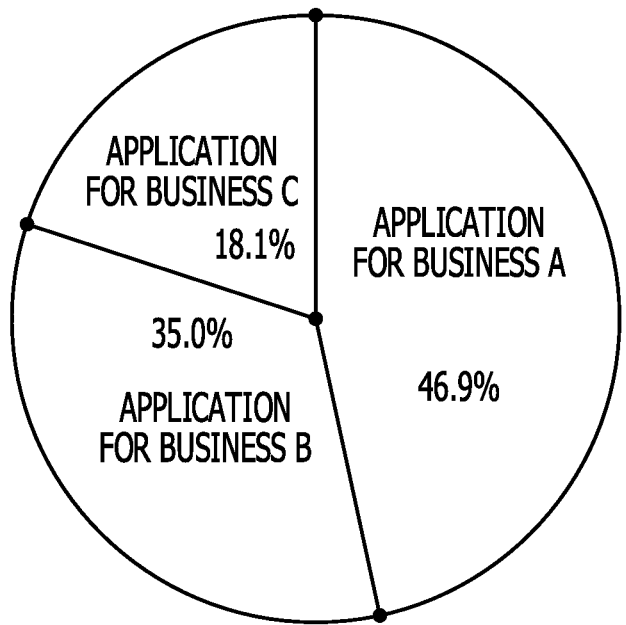
FIGS. 11A, 11B, and 11C illustrate examples of analysis of information collected by an analysis device used in an embodiment.
Figure 11B:
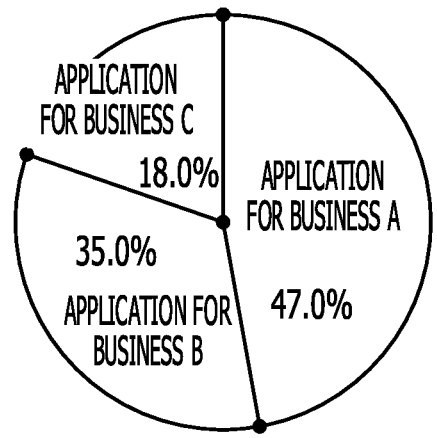
Figure 11C:
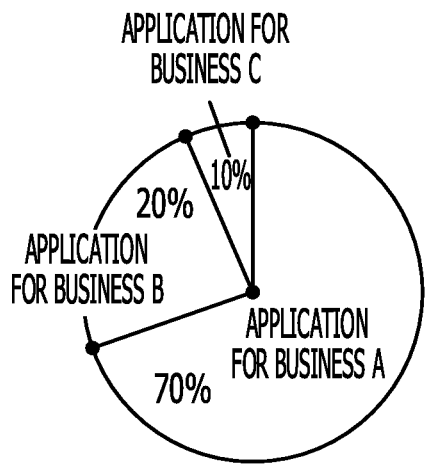

FIGS. 11A to 11C illustrate examples of analysis of information collected by an analysis device used in an embodiment. The case where communication analysis is performed by the analysis device 390 in accordance with the process illustrated in FIG. 10 on the basis of collected packets is illustrated in FIGS. 11A to 11C as an example of communication analysis. In the example illustrated in FIGS. 11A to 11C, the communication frequency for each of a plurality of business applications is analyzed.

In FIGS. 11A, 11B, and 11C, examples in which the number of packets used for execution of communication analysis differs from one another are illustrated. FIG. 11A illustrates an example in which the number of packets used for analysis is the largest. FIG. 11C illustrates an example in which the number of packets used for analysis is the smallest. FIG. 11B illustrates an example in which the number of packets used for analysis is between the number of packets used for the analysis illustrated in FIG. 11A and the number of packets used for the analysis illustrated in FIG. 11C. The examples illustrated in FIGS. 11A, 11B, and 11C are not examples in the case where packets communicated in different periods are sampled but examples in which sampling is performed in the same period. The examples illustrated in FIGS. 11A, 11B, and 11C are provided for explaining that a difference in the accuracy of analysis occurs due to the difference in the number of sampled packets even if sampling is performed in the same period.

FIG. 11A illustrates that the result of communication analysis is that communication for an application for business A, communication for an application for business B, and communication for an application for business C are performed at a ratio of 46.9%, 35.0%, and 18.1%, respectively. FIG. 11B illustrates that the result of communication analysis is that communication for the application for the business A, communication for the application for the business B, and communication for the application for the business C are performed at a ratio of 47.0%, 35.0%, and 18.0%, respectively. As is clear from FIGS. 11A and 11B, analysis results are converged when a certain number of packets are collected for communication analysis.

In contrast, FIG. 11C illustrates that the result of communication analysis is that communication for the application for the business A, communication for the application for the business B, and communication for the application for the business C are performed at a ratio of 70%, 20%, and 10%, respectively. As illustrated in FIG. 11C, even if sampling is performed in the same period, when a small number of packets are used for communication analysis, values deviated from the convergence values of the analysis results illustrated in FIGS. 11A and 11B are obtained. Accordingly, the accuracy of analysis decreases.

According to the embodiment described above, constraints are imposed on the upper limit of the transfer amount of packets to be transferred to a communication circuit. Even if the communication amount differs from flow to flow, which is a unit of communication, since the number of packets to be transferred to the communication circuit for communication analysis is determined for each flow, a number of packets equal to or greater than the number of packets to be used for communication analysis are capable of being transmitted to the analysis device. For example, even in the case where the communication amount of a communication operation to be subjected to communication analysis illustrated in FIGS. 11A to 11C is small, by performing sampling in such a manner that packets based on a different communication operation having a large communication amount are thinned out, a certain number of packets to be used for communication analysis are ensured to be collected.

This is because, as described with reference to FIGS. 11A to 11C, the accuracy of communication analysis is converged in accordance with the type of communication analysis when a certain number or more of packets are collected. Once an accuracy desired for communication analysis is determined, since collecting packets more than the number of packets for realizing the determined accuracy is redundant, for example, the number of packets to be sampled for a flow having a large communication amount may be decreased as long as the number of sampled packets is not below the number of packets to be used for communication analysis. In addition, the amount of decrease in the number of sampled packets may be applied to sampling for packets having a small communication amount. In the case of a communication operation having a small communication amount, the order of several minutes may be taken to collect packets to be used for communication analysis. Thus, by increasing the number of sampled packets having a small communication amount, communication analysis with a high accuracy is capable of being performed at high speed.

Furthermore, for example, in the case where regarding HTTP communication, detailed communication analysis is performed in such a manner that the use frequency of a business application and the frequency of access to the business application are examined for each login ID, the number of packets to be used for communication analysis increases. Thus, by changing the above-mentioned variable An for each communication operation within the constraints of the upper limit of the transfer amount of packets to be transferred to a communication circuit and applying the amount of decrease in the number of packets to be sampled for communication analysis to sampling for a flow in which a large number of packets are to be used for communication analysis, in accordance with the details of communication analysis, the number of packets to be transferred may be increased.

Furthermore, for example, by setting the above-mentioned variable An to "1" for each communication operation, the number of packets to be sampled for each communication may be made the same and the accuracy of communication analysis based on packets sampled within a specific period of time may be made the same for each communication operation.

Figure 12:
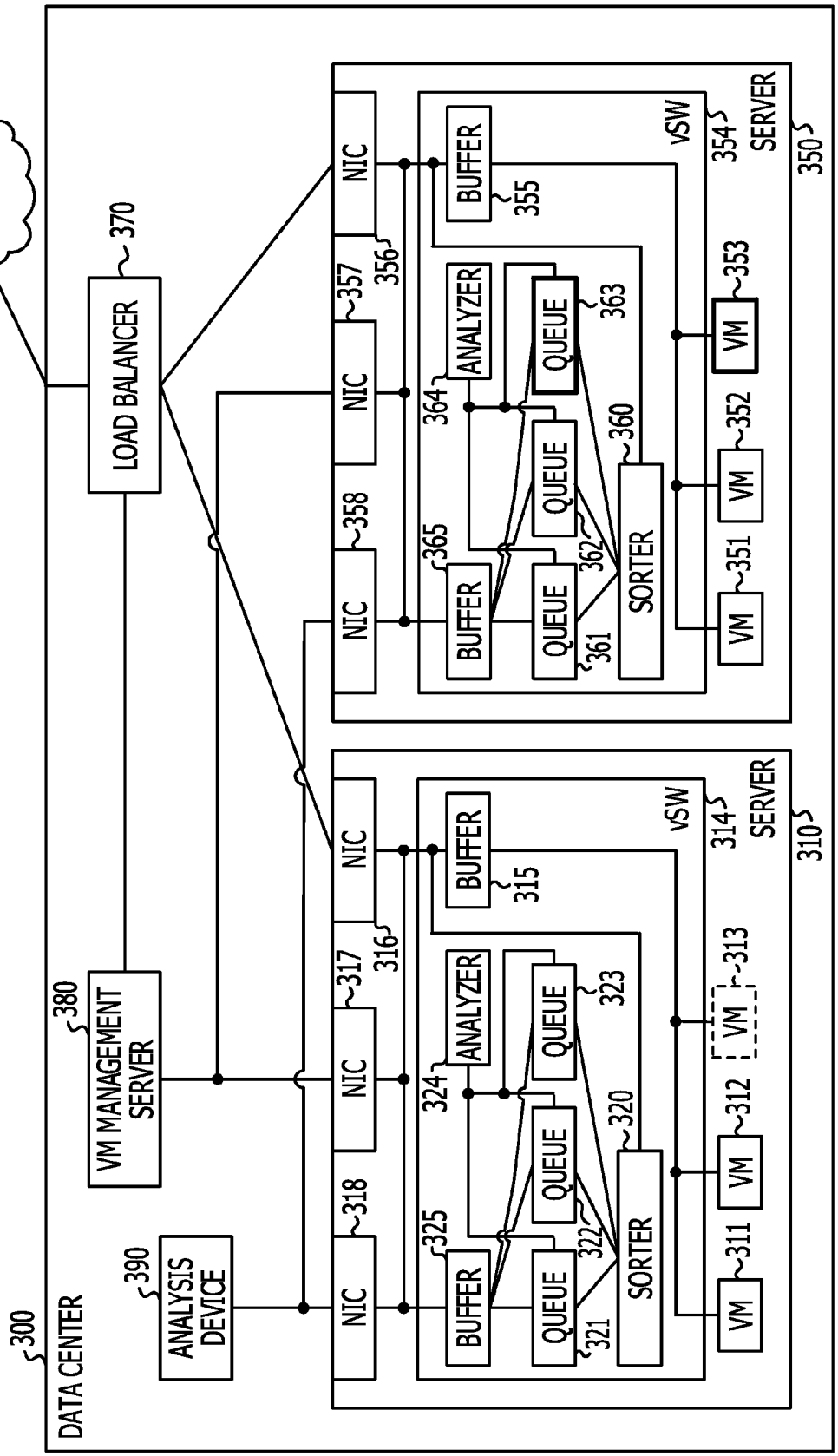
FIG. 12 illustrates another example of an information processing system according to an embodiment.

FIG. 12 illustrates another example of an information processing system according to an embodiment. In FIG. 12, the same components as those in the configuration illustrated in FIG. 3 are referred to with the same reference numerals. FIG. 12 is different from FIG. 3 in that for the purpose of load balancing, some of a plurality of communication operations by the virtual machine 313 that operates in the server 310 are performed by a virtual machine 353 that newly operates in the server 350. In the example illustrated in FIG. 12, for example, in the case where the CPU usage rate in the server 310 is increased by the increase of the amount of processing by the virtual machine 313, in order to distribute the load in the data center 300, the VM management server 380 that has been monitoring the load of the server 310 causes the new virtual machine 353 to be provided in the server 350, the load balancer 370 that has received a notification from the VM management server 380 transmits to the virtual machine 353 processing requested from a client to the virtual machine 313, and the virtual machine 353 performs the processing requested from the client. Furthermore, FIG. 12 is different from FIG. 3 in that since communication to be performed by the virtual machine 353 is newly generated in the server 350, a queue 363 is newly allocated within the virtual switch 354 in accordance with processing 630 illustrated in FIG. 6. Processing performed by the VM management server 380 and the load balancer 370, functional blocks, and the like will be described later.

Figure 13:
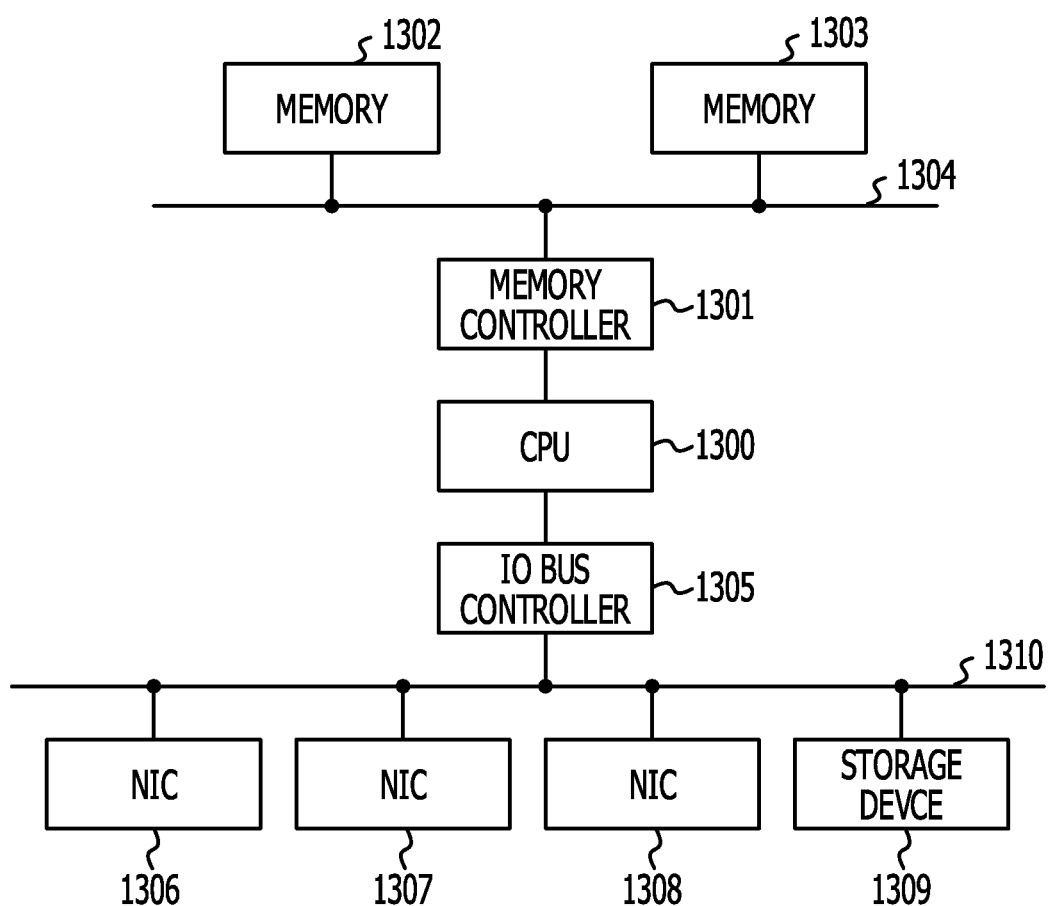
FIG. 13 illustrates an example of the hardware configuration of a VM management server used in an embodiment.

FIG. 13 illustrates an example of the hardware configuration of a VM management server used in an embodiment. The VM management server 380 to which an embodiment is applied includes a CPU 1300, a memory controller 1301, memories 1302 and 1303, a memory bus 1304, an IO bus controller 1305, NICs 1306 to 1308, a storage device 1309, and an IO bus 1310.

A program for executing various types of processing of the VM management server 380 is stored in at least one of the memories 1302 and 1303 coupled to the memory bus 1304. The CPU 1300 reads a program from the memories 1302 and 1303 via the memory controller 1301 and performs various types of processing. In accordance with the various types of processing performed by the CPU 1300, writing and reading of data to and from the memories 1302 and 1303 are performed via the memory controller 1301.

The CPU 1300 transfers via the IO bus controller 1305 to the NICs 1306 to 1308, which are coupled to the IO bus 1310, data and packets transmitted from the VM management server 380, and receives data and packets transmitted to the VM management server 380. The CPU 1300 reads data via the IO bus controller 1305 from the storage device 1309, which is coupled to the IO bus 1310, and writes data to the storage device 1309.

The CPU 1300 may include one or more CPU cores for executing various types of processing. Furthermore, each of the CPU cores may include one or more processors. The memories 1302 and 1303 are each, for example, an RAM, such as a DRAM. The storage device 1309 is, for example, a nonvolatile memory, such as a ROM or a flash memory, or a magnetic disk device, such as an HDD. The configuration in which the CPU 1300, the memory controller 1301, the memories 1302 and 1303, the NICs 1306 to 1308, and the storage device 1309 are coupled to the same bus may be applied to an embodiment. With the hardware configuration illustrated in FIG. 13, processing and functional blocks of the VM management server 380 are implemented, as described later.

Figure 14:
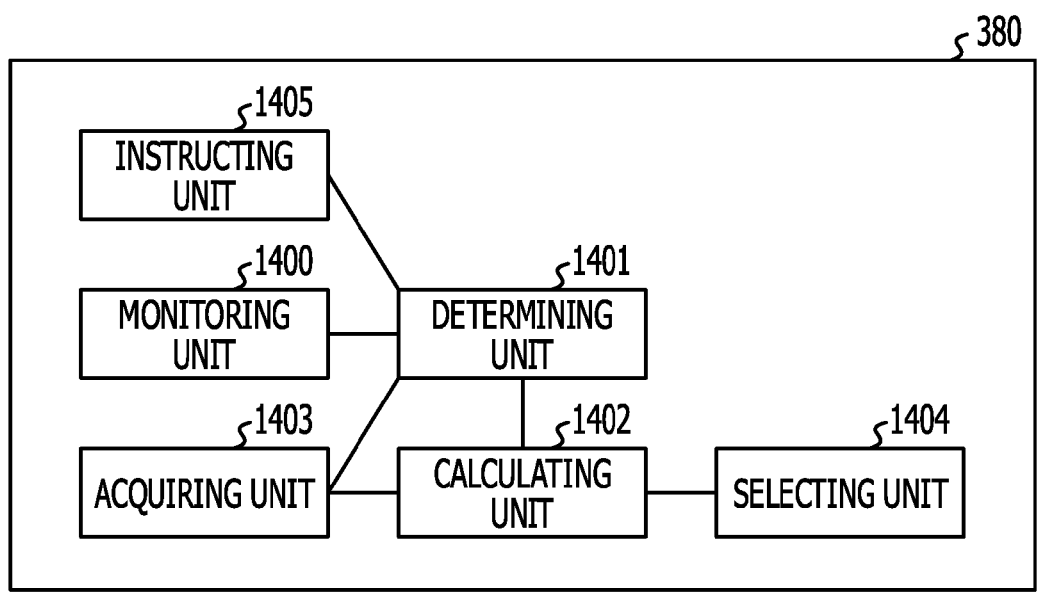
FIG. 14 illustrates an example of functional blocks of a VM management server used in an embodiment.

FIG. 14 illustrates an example of functional blocks of a VM management server used in an embodiment. When a program stored in the storage device 1309 is loaded to the memories 1302 and 1303 used as working memories and the program loaded to the memories 1302 and 1303 is executed by the CPU 1300, the VM management server 380 functions as a monitoring unit 1400, a determining unit 1401, a calculating unit 1402, an acquiring unit 1403, a selecting unit 1404, and an instructing unit 1405. Processing performed by the individual functional blocks will be described later in accordance with the processes illustrated in FIGS. 16 and 17.

FIGS. 15A to 15C illustrate management information managed by a VM management server used in an embodiment. Management information containing information illustrated in FIGS. 15A, 15B, and 15C is stored in the memories 1302 and 1303. Management information for the virtual machine 313 performed by the server 310 illustrated in FIG. 12 will be described later.

FIG. 15A illustrates information in which the ID of a virtual machine is associated with the usage rate of a CPU core used by the virtual machine. For example, in the VM management server 380, the virtual machine 313 is managed under the ID of "2". Since referring to operation information of a virtual machine acquired from the server 310 by the VM management server 380, the usage rate of a CPU core for the virtual machine 313 in the server 310 is "90%", "90%" is associated with the ID "2". As is described later, in the VM management server 380, a CPU core usage rate threshold is set, and it is determined whether or not load balancing for a virtual machine that uses a CPU core at a usage rate higher than the threshold is possible. In this example, the case where load balancing is performed for the virtual machine 313 whose CPU core usage rate is "90%" will be explained by way of example.

FIG. 15B illustrates information in which the type of communication operation performed by a virtual machine whose CPU core usage rate is higher than the threshold and the usage rate of a CPU core used for the communication operation. For example, the CPU core usage rate for communication that passes through the load balancer 370, such as, for example, a communication operation with a client coupled to the network 305, among communication operations performed by the virtual machine 313 whose CPU core usage rate is "90%", is "30%". In contrast, the CPU core usage rate by the virtual machine 313 for communication that does not pass through the load balancer 370, like a communication operation for the virtual machine 311 or 312 in the server 310, is "60%". The above-mentioned percentage of the CPU usage rate may be determined on the basis of operation information of a virtual machine acquired by the VM management server 380 from the server 310.

FIG. 15C illustrates information in which a traffic number, a transmission source MAC address, communication amount, a flow ID, and a CPU usage rate are associated with one another. A traffic number is assigned in order to identify a communication operation that passes through the load balancer 370 from among communication operations performed by a virtual machine whose CPU core usage rate is higher than the threshold. A transmission source address is associated with a traffic number for identifying a communication operation. As described later, a transmission source address is associated with a traffic number so that the VM management server 380 is capable of causing the load balancer 370 to perform switching of communication for load balancing.

Furthermore, as illustrated in FIG. 15C, communication amount is associated with a traffic number. Furthermore, a flow ID identified in accordance with the communication categorization policy for communication analysis as illustrated in FIGS. 5B and 5C is associated with a traffic number. As described later, the association between a flow ID and a traffic number is used for management of queues in the case where the virtual machine 353 is newly provided in the server 350. Furthermore, the usage rate of a CPU core used for communication is associated with a traffic number. This information is also used for management of queues.

Figure 16:
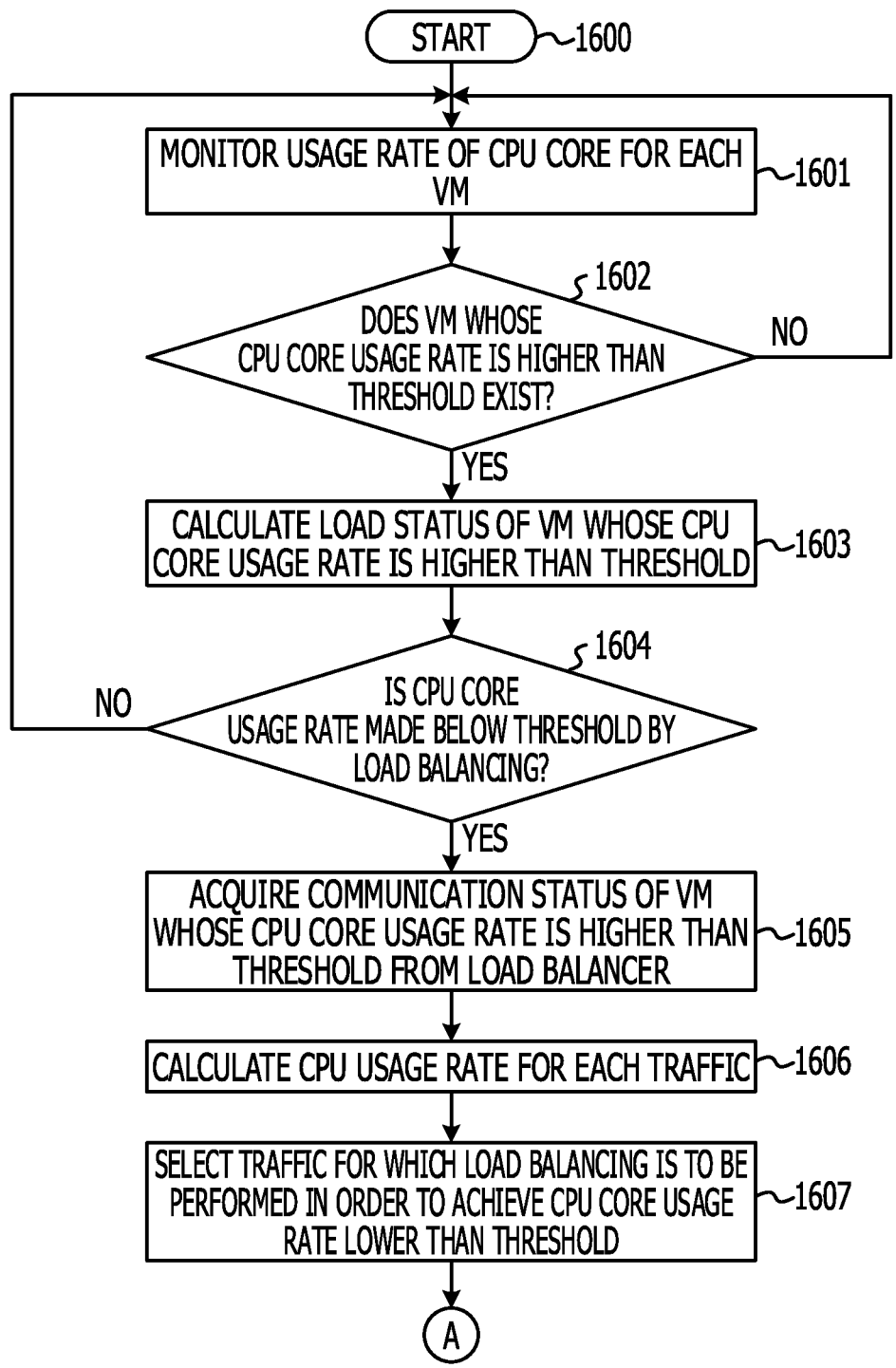
FIG. 16 illustrates an example of a process performed by a VM management server used in an embodiment.

FIG. 16 illustrates an example of a process performed by a VM management server used in an embodiment. In the example illustrated in FIG. 16, the process is performed by the VM management server 380 illustrated in FIG. 12 when a program stored in the storage device 1309 is loaded to the memories 1302 and 1303 used as working memories and the program loaded to the memories 1302 and 1303 is executed by the CPU 1300. Processing 1600 for starting a process for performing switching of communication for load balancing is performed by the VM management server 380.

Processing 1601 for monitoring the CPU core usage rate for each virtual machine is performed by the monitoring unit 1400. The information illustrated in FIG. 15A is updated in accordance with the CPU core usage rate monitored in processing 1601.

Processing 1602 for determining whether or not a virtual machine whose CPU core usage rate is higher than the threshold exists is performed by the determining unit 1401. In processing 1602, the determining unit 1401 determines, on the basis of the information illustrated in FIG. 15A, whether or not a CPU core is used at a usage rate higher than the set threshold. In the case where it is determined that a virtual machine whose CPU core usage rate is higher than the threshold does not exist, the process returns to processing 1601, and continues to perform monitoring of the CPU core usage rate for each virtual machine. In the case where it is determined that a virtual machine whose CPU core usage rate is higher than the threshold exists, the process proceeds to processing 1603. For example, in the case where the threshold is set to "80%", since the CPU core usage rate of a virtual machine having an ID of "2" is "90%", which is higher than the threshold, as illustrated in FIG. 15A, the virtual machine having an ID of "2" is identified in processing 1602.

Processing 1603 for calculating the load status of a virtual machine whose CPU core usage rate is higher than the threshold is performed by the calculating unit 1402. In processing 1603, the CPU core usage rate for communication that passes through the load balancer 370, such as a communication operation with a client coupled to the network 305, and the CPU core usage rate for communication that does not pass through the load balancer 370, like a communication operation with a different virtual machine in a server, among communication operations performed by the virtual machine for which it is determined in processing 1602 that the CPU core is used at a usage rate higher than the threshold, are calculated. The management information illustrated in FIGS. 15A to 15C is updated on the basis of the calculated information. For example, regarding communication operations performed by a virtual machine identified in processing 1602 and whose ID is "2", as illustrated in FIG. 15B, it is calculated such that the CPU core usage rate for communication that passes through the load balancer 370 is "30%" and the CPU core usage rate for communication that does not pass through the load balancer 370 is "60%".

Processing 1604 for determining whether or not the CPU core usage rate is made lower than the threshold by load balancing is performed by the determining unit 1401. I processing 1604, it is determined, on the basis of the CPU core usage rate for communication that passes through the load balancer 370, which is calculated in processing 1603, whether or not the CPU core usage rate is made lower than the threshold in the case where switching is performed such that a communication operation that passes through the load balancer 370 is performed by a different virtual machine. As described above, for example, when the CPU core usage rate threshold is set to "80%" in the case illustrated in FIGS. 15A and 15B, since the CPU core usage rate of the virtual machine 313 whose ID is "2" is "90%", which is higher than the threshold "80%" as illustrated in FIG. 15A, processing 1603 is performed. As a result, as illustrated in FIG. 15B, it is calculated that the CPU core usage rate for communication performed by the virtual machine 313 through the load balancer 370 is "30%". In this case, in processing 1604, if switching is performed such that a communication operation performed by the virtual machine 313 via the load balancer 370 is performed by a different virtual machine, the CPU core usage rate of the virtual machine 313 is decreased from "90%" to "60%", and it is determined that the CPU core usage rate is lower than the threshold "80%". In processing 1604, in the case where it is determined that the CPU core usage rate is lower than the threshold, the process proceeds to processing 1605. In the case where it is determined that the CPU core usage rate is not lower than the threshold, in order to continue monitoring of the CPU core usage rate of a virtual machine, the process returns to processing 1601.

Processing 1605 for acquiring the communication status of the virtual machine whose CPU core usage rate is higher than the threshold from the load balancer is performed by the acquiring unit 1403. Since the load balancer 370 manages the status of communication performed through the load balancer 370, for example, communication operations performed by the virtual machine 313 through the load balancer 370 are managed as traffics by the load balancer 370. In processing 1605, the VM management server 380 acquires the address of a communication device for a traffic relating to the virtual machine 313 and the communication amount as the communication status.

Processing 1606 for calculating the CPU core usage rate for each traffic is performed by the calculating unit 1402. In processing 1606, the CPU core usage rate for each traffic is calculated by, for example, proportionally dividing the CPU core usage rate of communication performed by a virtual machine through the load balancer, which is calculated in processing 1603, by the communication amount for the traffic acquired in processing 1605. For example, in the case where the CPU core usage rate for communication performed by the virtual machine 313 through the load balancer 370 is "30%" and the communication status by the virtual machine 313 is as illustrated in FIG. 15C, the CPU core usage rate of a traffic whose communication amount is 1 Gbps and whose traffic number is "1" is calculated as "7.5%" by proportional division. In accordance with the information acquired in processing 1605 and the information calculated in processing 1606, the information illustrated in FIG. 15C is updated.

Processing 1607 for selecting a traffic for which load balancing is to be performed so that the CPU core usage rate is made lower than the threshold is performed by the selecting unit 1404. In processing 1607, for example, on the basis of the CPU core usage rate illustrated in FIG. 15C, it is determined which traffic is to be executed not by the virtual machine 313 but by a different virtual machine so that the CPU core usage rate of the virtual machine 313, which is "90%", is made lower than the threshold, which is "80%". For example, it is determined that the CPU core usage rate of the virtual machine 313 is decreased from "90%" to "75%" when traffics whose traffic numbers are "0" and "1" are performed by a different virtual machine, and the traffics whose traffic numbers are "0" and "1" are selected as traffics for which load balancing is to be performed. In contrast, it may be determined that the CPU core usage rate of the virtual machine 313 is decreased from "90%" to "75%" when a traffic whose traffic number is "2" is performed by a different virtual machine, and the traffic whose traffic number is "2" may be selected as a traffic for which load balancing is to be performed. Furthermore, it may be determined that the CPU core usage rate is decreased from "90%" to "67.5%" when both the traffics whose traffic numbers are "0" and "2" are performed by a different virtual machine, and both the traffics whose traffic numbers are "0" and "2" may be selected as traffics for which load balancing is to be performed. Furthermore, in the case where the CPU core usage rate of communication that does not pass through the load balancer is ensured or it is predicted that the CPU core usage rate of communication that does not pass through the load balancer increases, all the traffics whose traffic numbers are "0", "1", and "2" may be selected as traffics for which load balancing is to be performed.

As described above, in the process illustrated in FIG. 16, the CPU core usage rate of a virtual machine is monitored, and a selection as to which traffic is to be moved in order to achieve load balancing is performed.

Figure 17:
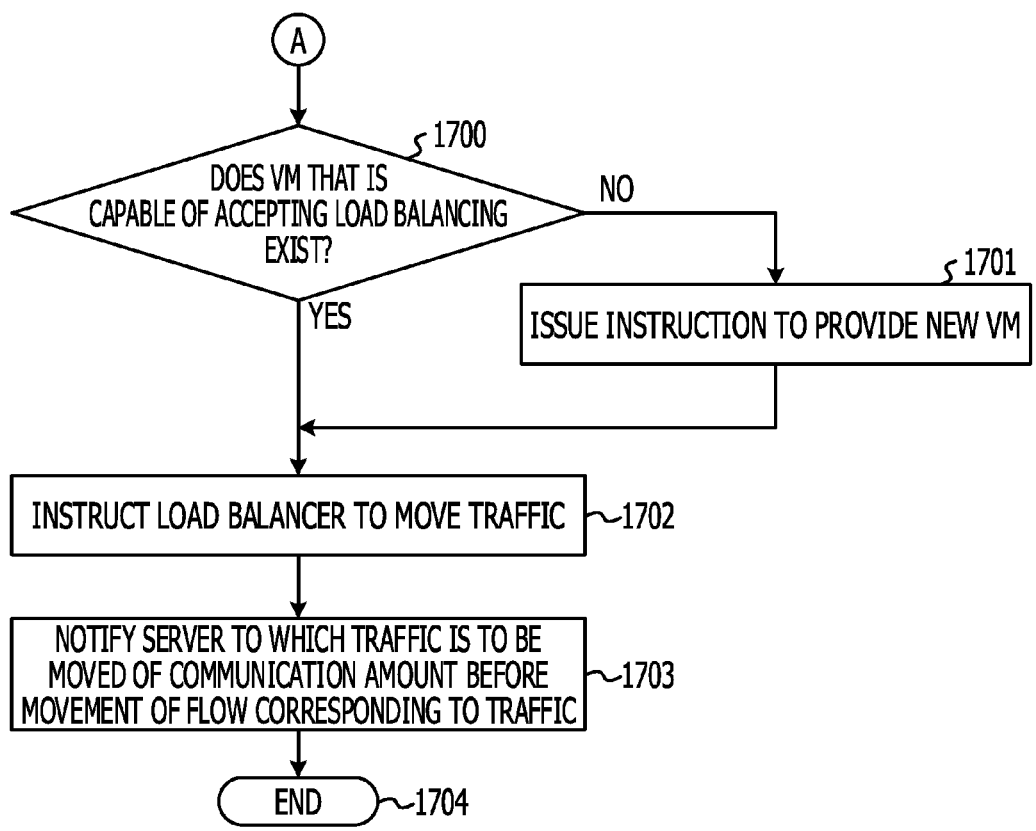
FIG. 17 illustrates an example of a process performed by a VM management server used in an embodiment.

FIG. 17 illustrates an example of a process performed by a VM management server used in an embodiment. The example of the process illustrated in FIG. 17 is performed by the VM management server 380 illustrated in FIG. 12 when a program stored in the storage device 1309 is loaded to the memories 1302 and 1303 used as working memories and the program loaded to the memories 1302 and 1303 is performed by the CPU 1300. The process illustrated in FIG. 17 is performed subsequent to processing 1607 illustrated in FIG. 16.

Processing 1700 for determining whether or not a virtual machine that is capable of accepting load balancing is performed by the determining unit 1401. In processing 1700, it is determined whether or not a different virtual machine that is capable of taking over the traffic selected in processing 1607 exists. For example, if the sum of the CPU core usage rate of a different virtual machine managed by the VM management server 380 and the CPU core usage rate calculated in processing 1606 does not exceed the CPU core usage rate threshold, it is determined that the different virtual machine is capable of accepting load balancing. In the case where it is determined that no virtual machine that is capable of accepting load balancing exists, the process proceeds to processing 1701. In the case where it is determined that a virtual machine that is capable of accepting load balancing exists, the process proceeds to processing 1702.

Processing 1701 for issuing an instruction to provide a new virtual machine is performed by the instructing unit 1405. In processing 1701, a different virtual machine that takes over the traffic selected in processing 1607 is newly performed by a server in the data center 300. For example, the VM management server 380 instructs the server 350 to cause the virtual machine 353 to newly operate, and the virtual machine 353 takes over the traffic that is originally to be performed by the virtual machine 313 that operates in the server 310.

Processing 1702 for instructing the load balancer to move the traffic is performed by the instructing unit 1405. In processing 1702, an instruction to move the traffic is issued to the load balancer 370 in such a manner that the destination of the traffic selected in processing 1607 is set to the different virtual machine that is to take over the traffic, together with notification of the address of the virtual machine from which the traffic is to be moved and the address of the different virtual machine that is to take over the traffic. As described later, once receiving a packet in which the original virtual machine from which the traffic is to be moved is set as the destination address, the load balancer 370 changes the destination address to the address of the different virtual machine that is to take over the traffic and transmits the packet to the different virtual machine.

Processing 1703 for notifying the server to which the traffic is moved of the communication amount of a flow corresponding to the traffic before movement is performed by the instructing unit 1405. In processing 1703, the communication amount actually measured before the movement of the traffic is reported to the server in which the virtual machine that is to take over the traffic is newly provided. With processing 1703, the reported communication amount is capable of being used as a predicted value even before the server to which the traffic is moved newly measures the communication amount of the moved traffic. Thus, the sampling amount for each flow, which is a unit of communication analysis, is capable of being determined on the basis of the predicted value, as described above with reference to FIG. 10, without waiting for actual measurement of the communication amount.

In processing 1703, the communication amount to be reported may be corrected in accordance with a difference between the physical resource allocated to the virtual machine that has performed the traffic and the physical resource allocated to the virtual machine that is to take over the traffic. For example, in the case where constraints are imposed on the physical resource to be allocated to the virtual machine that is to take over the traffic, correction may be made in such a manner that the communication amount is estimated smaller than what it actually is in proportion to the amount of decrease in the ratio of allocation of physical resources. In this case, a more probable communication amount is capable of being used as a predicted value.

After completion of processing 1703, in the case where monitoring of the CPU core usage rate of each virtual machine does not continue to be performed, processing 1704 for terminating the processes illustrated in FIGS. 16 and 17 is performed by the VM management server 380.

Figure 18:
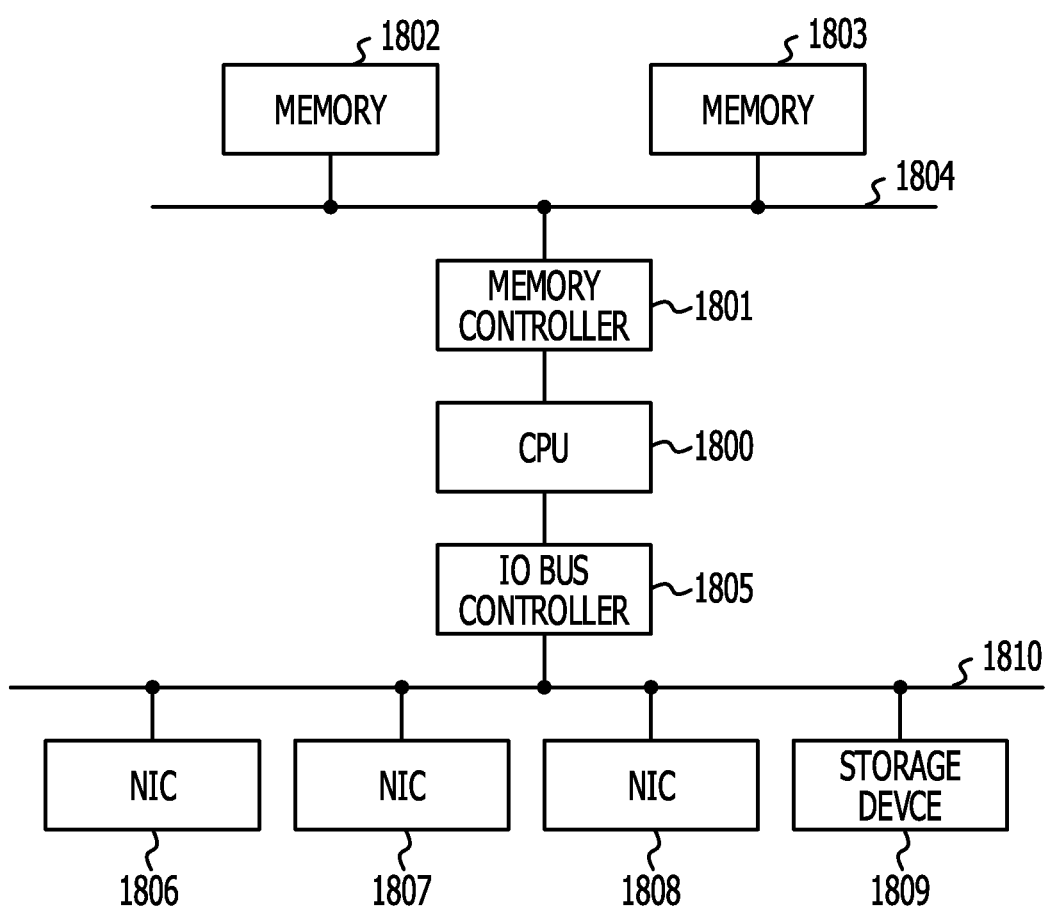
FIG. 18 illustrates an example of the hardware configuration of a load balancer used in an embodiment.

FIG. 18 illustrates an example of the hardware configuration of a load balancer used in an embodiment. The load balancer 370 to which an embodiment is applied includes a CPU 1800, a memory controller 1801, memories 1802 and 1803, a memory bus 1804, an IO bus controller 1805, NICs 1806 to 1808, a storage device 1809, and an IO bus 1810.

A program for executing various types of processing of the load balancer 370 is stored in at least one of the memories 1802 and 1803, which are coupled to the memory bus 1804. The CPU 1800 reads a program from the memories 1802 and 1803 via the memory controller 1801, and performs various types of processing. In accordance with the various types of processing performed by the CPU 1800, writing and reading of data to and from the memories 1802 and 1803 are performed via the memory controller 1801.

The CPU 1800 transfers via the IO bus controller 1805 to the NICs 1806 to 1808, which are coupled to the IO bus 1810, data and packets transmitted from the load balancer 370, and receives data and packets transmitted to the load balancer 370. The CPU 1800 reads data via the IO bus controller 1805 from the storage device 1809, which is coupled to the IO bus 1810, and writes data to the storage device 1809.

The CPU 1800 may include one or more CPU cores for executing various types of processing. Furthermore, each of the CPU cores may include one or more processors. The memories 1802 and 1803 are each, for example, an RAM, such as a DRAM. The storage device 1809 is, for example, a nonvolatile memory, such as a ROM or a flash memory, or a magnetic disk device, such as an HDD. The configuration in which the CPU 1800, the memory controller 1801, the memories 1802 and 1803, the NICs 1806 to 1808, and the storage device 1809 are coupled to the same bus may be applied to an embodiment. With the hardware configuration illustrated in FIG. 18, as described later, processing and functional blocks of the load balancer 370 are implemented.

Figure 19:
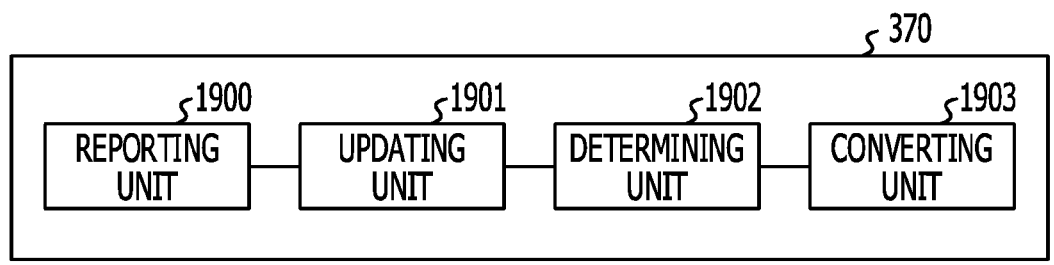
FIG. 19 illustrates an example of functional bocks of a load balancer used in an embodiment.

FIG. 19 illustrates an example of functional blocks of a load balancer used in an embodiment. The load balancer illustrated in FIG. 19 functions as a reporting unit 1900, an updating unit 1901, a determining unit 1902, and a converting unit 1903 when a program stored in the storage device 1809 is loaded to the memories 1802 and 1803 used as working memories and the program loaded to the memories 1802 and 1803 is executed by the CPU 1800. Processing performed by the individual functional blocks will be described later with reference to a process illustrated in FIG. 20.

Figure 20:
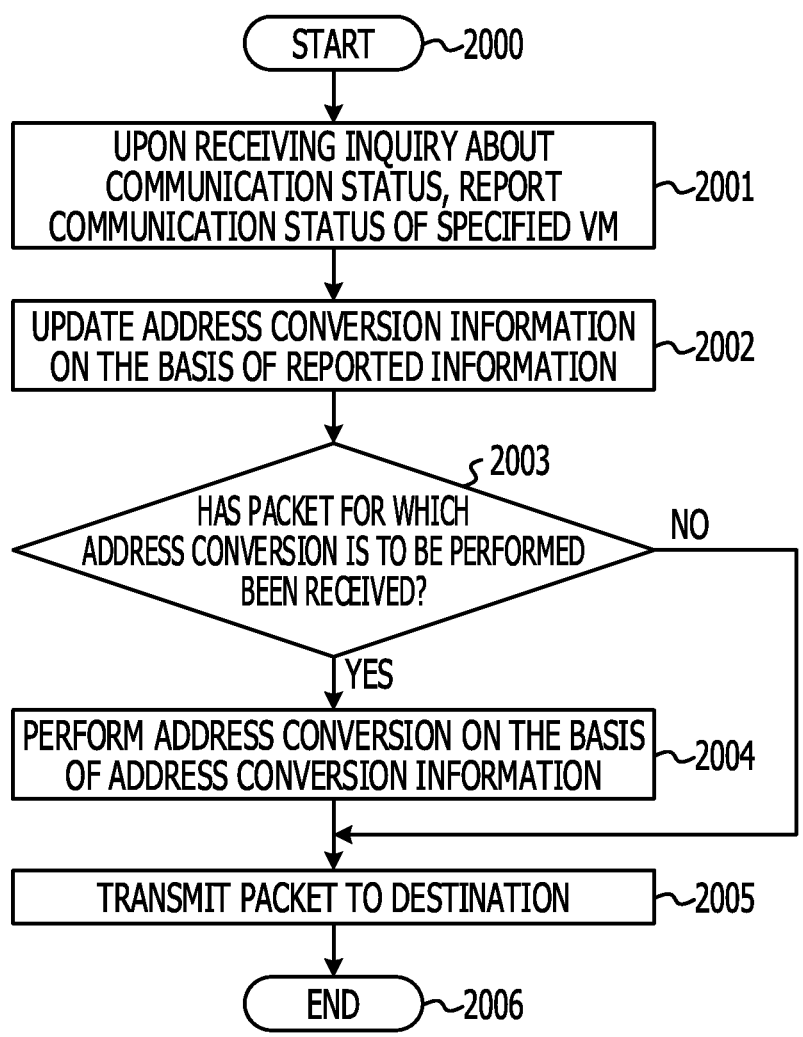
FIG. 20 illustrates an example of a process performed by a load balancer used in an embodiment.

FIG. 20 illustrates an example of a process performed by a load balancer used in an embodiment. The example of the process illustrated in FIG. 20 is performed by the load balancer 370 illustrated in FIG. 12 when a program stored in the storage device 1809 is loaded to the memories 1802 and 1803 and the program loaded to the memories 1802 and 1803 is executed by the CPU 1800.

When an inquiry about the communication status is received, processing 2001 for reporting the communication status of a specified virtual machine is performed by the reporting unit 1900. The load balancer 370 manages the status of communication between a client outside the data center 300 and the servers 310 and 350 in the data center 300. In processing 2001, when the VM management server 380 receives an inquiry about the communication status in relation to processing 1605, the communication amount of each traffic relating to the specified virtual machine is reported as the communication status to the VM management server 380.

Processing 2002 for updating address conversion information on the basis of the reported information is performed by the updating unit 1901. In processing 2002, on the basis of the movement of the traffic instructed by the VM management server 380 in processing 1702, address conversion information is updated. Since the VM management server 380 designates to the load balancer 370 the address of the virtual machine from which the traffic is moved and the address of the different virtual machine to which the traffic is moved in processing 1702, the load balancer 370 updates address conversion information for managing the association of addresses in such a manner that a destination address is changed to the moved destination address so that the different virtual machine of the moved destination address is capable of processing a request in which the original source address is set as the destination address when the request is received from a client in processing 2002.

Processing 2003 for determining whether or not a packet for which address conversion is to be performed is received is performed by the determining unit 1902. The determining unit 1902 determines whether or not the destination address of the received packet is a destination for which address conversion in the address conversion information is to be performed. In the case where it is determined that address conversion is to be performed, the process proceeds to processing 2004. In the case where it is determined that address conversion is not to be performed, the process proceeds to processing 2005.

Processing 2004 for performing address conversion on the basis of the address conversion information is performed by the converting unit 1903. In processing 2004, on the basis of the address conversion information updated in processing 2002, the destination address of the packet received by the load balancer 370 is converted. Then, processing 2005 for transmitting the packet on the basis of the destination address is performed by a transmitting unit.

Figure 21:
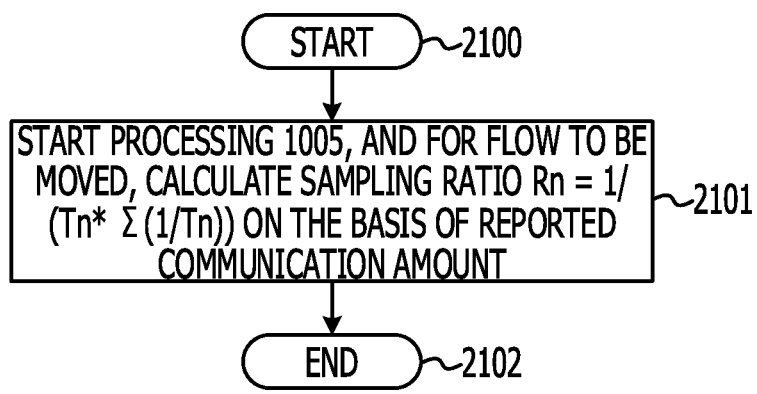
FIG. 21 illustrates another example of a process performed by an analyzer used in an embodiment.

FIG. 21 illustrates another example of a process performed by an analyzer used in an embodiment. The example of the process illustrated in FIG. 21 is performed by the analyzers 324 and 364 illustrated in FIG. 3 when a program stored in the storage device 209 is loaded to the memories 202 and 203 used as working memories and the program loaded to the memories 202 and 203 is executed by the CPU 200. The case where the process is performed by the analyzer 364 will be explained as an example. However, a similar process is also performed by the analyzer 324.

Processing 2100 for starting the process illustrated in FIG. 21 is performed by the analyzer 364 in the server 350 to which provision of the new virtual machine 353 is reported from the VM management server 380 in processing 1701. Processing 2100 may be started out of synchronization with the process performed by an analyzer illustrated in FIG. 10.

Processing 1005 starts, and for a flow to be moved, processing 2101 for calculating the sampling ratio $Rn=1/(Tn*\Sigma(1/Tn))$ on the basis of the reported communication amount is performed. In processing 2101, on the basis of the communication amount reported in processing 1703 as a predicted value, the sampling ratio $Rn=1/(Tn*\Sigma(1/Tn))$ is recalculated. Processing 1005 and later processing are capable of being performed without waiting for the determination of processing 1004 illustrated in FIG. 10.

FIG. 22 illustrates an example of a process performed by an information processing system according to an embodiment. The case where in order to achieve the above-described load balancing, the virtual machine 353 is newly provided in the server 350 and the sampling amount of a queue is determined by the analyzer 364 on the basis of a reported communication amount as a predicted value is illustrated in the example of FIG. 22.

The VM management server 380 performs communication C1 for making an inquiry about the CPU core usage rate to the servers 310 and 350. As a response to communication C1, the servers 310 and 350 perform communication C2 for sending the CPU core usage rate of individual virtual machines that operate in the servers. Communication C1 and communication C2 correspond to processing 1601 illustrated in FIG. 16. The CPU core usage rate of the virtual machines acquired in communication C2 is managed as the information illustrated in FIG. 15A by the VM management server 380. Here, it is assumed that it is determined in processing 1602, on the basis of the information acquired in communication C2, that the CPU core usage rate of the virtual machine 313 operating in the server 310 is higher than the threshold and a traffic that has been performed by the virtual machine 313 is to be moved to the virtual machine 353, which newly operates in the server 350 in processing 1702.

Communication C3 for making an inquiry about the communication status of the virtual machine 313 to the load balancer 370 is performed by the VM management server 380, and communication C4 for sending the communication status is performed by the load balancer 370. Communication C4 corresponds to processing 2001 illustrated in FIG. 20. As explained in processing 1605 illustrated in FIG. 16, the VM management server 380 acquires the communication status of the virtual machine 313 in communication C4.

Communication C5 for instructing the server 350 to cause the virtual machine 353 to operate is performed by the VM management server 380. Communication C5 corresponds to processing 1701 illustrated in FIG. 17.

Communication C6 for instructing the server 310 to transmit the communication amount of each flow performed by the virtual machine 313 to the server 350 is performed by the VM management server 380. Communication C7 for transmitting the communication amount of the virtual machine 313 calculated in processing 1001 to 1003 to the server 350 is performed by the server 310, which receives the instruction of communication C6. The server 350, which receives the information of the communication amount in communication C7, calculates the sampling ratio of a queue corresponding to the flow that is to be taken over by the server 350 instead of the virtual machine 313 on the basis of the received communication amount as a predicted value in processing 2101, and for example, processing 1005 to 1013 illustrated in FIG. 10 is performed.

Communication C8 for designating address conversion information is performed by the VM management server 380, corresponding to processing 1702. As a result of conversion of a destination address by the load balancer 370, which receives address conversion information, load-balanced communication C9 and another load-balanced communication C10 are performed for the virtual machine 353 that is caused to operate in the server 350, instead of the server 310.

As illustrated in FIG. 22, when the virtual machine 353 is caused to operate in communication C5, the sampling amount according to the processes illustrated in FIGS. 10 and 21 is determined again by the analyzer 364, on the basis of the communication amount acquired in communication C7 as a predicted value. Thus, communication analysis for communication C9 and communication C10 is capable of being performed on the basis of a more probable sampling amount, without waiting for actual measurement of the communication amount of communication C9 and communication C10. After actual measurement of the communication amount in processing 1001 to 1003 illustrated in FIG. 10, the sampling value is determined on the basis of the actual measurement in accordance with processing 1005 and later processing illustrated in FIG. 10. On the basis of the determined sampling value, sampling for communication analysis may be performed.

According to an embodiment, for load balancing, by using the communication amount before load balancing, the sampling value based on a predicted value is determined again while actual measurement of the communication amount after load balancing is being waited. Thus, sampling of packets for communication analysis is capable of being started quickly on the basis of a more probable sampling value.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing method comprising:
    determining the number of packets to be transferred to a communication circuit for each of a plurality of communications so that the number of packets of each of the plurality of communications is equal to or greater than the number of packets to be used for communication analysis, in accordance with the communication amount of each of the plurality of communications and an upper limit of the transfer amount of packets to be transferred to the communication circuit.

2. The information processing method according to claim 1,
    wherein the determined number of packets for each of the plurality of communications is determined so that the number of packets for each of the plurality of communications becomes same each other.

3. The information processing method according to claim 1,
    wherein in the case where the number of the plurality of communications changes, the number of packets to be transferred to the communication circuit is determined for each of the plurality of communications.

4. The information processing method according to claim 3,
    wherein the number of the plurality of communications is changed when a different virtual machine takes over a different communication, and
    the information processing method comprises:
    calculating the communication amount of the different virtual machine that takes over the different communication, based on the communication amount of a virtual machine for which the different communication is taken over; and
    determining the number of packets determined for each of the plurality of communications, based on the calculated communication amount.

5. The information processing method according to claim 4, comprising:
    correcting the calculated communication amount based on the communication amount allocated to the different virtual machine that takes over the different communication.

6. The information processing method according to claim 4,
    wherein the communication amount of the virtual machine for which the different communication operation is taken over is equal to the communication amount of communication that the virtual machine for which the different communication operation is taken over performs through the communication circuit.

7. The information processing method according to claim 1,
    wherein the plurality of communications are communications for individual virtual machines.

8. The information processing method according to claim 4,
    wherein in order to distribute processing load by the virtual machine for which the different communication is taken over, the different virtual machine takes over the different communication.

9. The information processing method according to claim 1, comprising:
    collecting the number of packets determined for each of the plurality of communications for a specific period of time to perform communication analysis.

10. The information processing method according to claim 1, comprising:
    thinning out packets for each of the plurality of communication operations, based on the number of packets determined for each of the plurality of communications, in order to transfer the number of packets determined for the communication operation to the communication circuit.

11. The information processing method according to claim 1,
    wherein the plurality of communications are sorted based on a unit of communication analysis based on a communication protocol, a destination address, or a transmission source address.

12. The information processing method according to claim 1,
    wherein the communication circuit is coupled to a bus that is coupled to a different communication circuit in order to transmit packets to an external apparatus, and the upper limit of the transfer amount of packets is set in accordance with the communication amount of the different communication circuit.

13. The information processing method according to claim 1,
    wherein the number of packets corresponding to the communication analysis is set in accordance with contents of processing of the communication analysis.

14. A computer-readable recording medium having stored therein a program for causing an information processing apparatus to execute an information process comprising:
    determining the number of packets to be transferred to a communication circuit for each of a plurality of communications so that the number of packets of each of the plurality of communications is equal to or greater than the number of packets to be used for communication analysis, in accordance with the communication amount of each of the plurality of communications and an upper limit of the transfer amount of packets to be transferred to the communication circuit.

15. An information processing apparatus comprising:
    a memory configured to store a program;
    a processor, based on the program, configured to:
    determine the number of packets to be transferred to a communication circuit for each of a plurality of communications so that the number of packets of each of the plurality of communications is equal to or greater than the number of packets to be used for communication analysis, in accordance with the communication amount of each of the plurality of communications and an upper limit of the transfer amount of packets to be transferred to the communication circuit.

* * * * *